(12) United States Patent
Nagataki et al.

(10) Patent No.: US 8,786,726 B2
(45) Date of Patent: *Jul. 22, 2014

(54) IMAGING PROCESSING APPARATUS, CAMERA SYSTEM, IMAGE PROCESSING METHOD, AND PROGRAM

(71) Applicant: Sony Corporation, Tokyo (JP)

(72) Inventors: Shingo Nagataki, Kanagawa (JP); Kenji Wajima, Tokyo (JP); Hiroshi Yamamoto, Chiba (JP); Katsuhisa Shinmei, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/927,508

(22) Filed: Jun. 26, 2013

(65) Prior Publication Data

US 2013/0286247 A1    Oct. 31, 2013

Related U.S. Application Data

(63) Continuation of application No. 13/064,913, filed on Apr. 26, 2011, now Pat. No. 8,488,016.

(30) Foreign Application Priority Data

May 31, 2010    (JP) .................................. 2010-124491

(51) Int. Cl.
*H04N 5/228*    (2006.01)
*H04N 5/235*    (2006.01)

(52) U.S. Cl.
USPC ..................................... 348/222.1; 348/221.1

(58) Field of Classification Search
USPC ....................... 348/223.1, 226.1, 222.1, 221.1
See application file for complete search history.

(56) References Cited

FOREIGN PATENT DOCUMENTS

JP    2002-069355    3/2002
JP    2004-222182    8/2004

*Primary Examiner* — Roberto Velez
*Assistant Examiner* — Stephen Coleman
(74) *Attorney, Agent, or Firm* — Rader, Fishman & Grauer PLLC

(57) ABSTRACT

A camera system, image processing method and computer program stored on a computer readable medium for image processing. Long and short accumulation images with longer and shorter exposure times are respectively obtained from one field. First and second long accumulation evaluation values are computed from the long accumulation image. A short accumulation evaluation value is computed from the short accumulation image. A short accumulation target exposure time and short accumulation exposure control information are acquired from the short accumulation evaluation value and a first target level. A long accumulation evaluation value is acquired by synthesizing the first and second long accumulation evaluation values. Long accumulation exposure control information is acquired from the long accumulation evaluation value and a second target level. An image is generated from the long accumulation image and the short accumulation image.

45 Claims, 14 Drawing Sheets

IMAGING PROCESSING APPARATUS, CAMERA SYSTEM, IMAGE PROCESSING METHOD, AND PROGRAM

CROSS REFERENCES TO RELATED APPLICATIONS

This is a Continuation Application of U.S. patent application Ser. No. 13/064,913 filed Apr. 26, 2011, now U.S. Pat. No. 8,488,016, which in turn claims priority from Japanese Patent Application No.: 2010-124491, filed in the Japan Patent Office on May 31, 2010, the entire contents of which being incorporated herein by reference.

BACKGROUND OF THE INVENTION

1. Field of the Invention

The present invention relates to an image processing apparatus, a camera system, an image processing method, and a program that perform synthesis processing on plural images with different exposure times.

2. Description of the Related Art

An image sensor as a solid-state image sensing device represented by CCD and CMOS (Complementary Metal Oxide Semiconductor) performs photoelectric conversion using a photoelectric conversion device that accumulates charge in response to an amount of incident light.

Recently, cameras using image sensors such as CCDs and CMOS sensors have been widely used.

However, generally, the image sensor has a representable dynamic range (hereinafter, referred to as DR) narrower than that of a silver salt camera or the like, and, if a subject at a high contrast ratio is imaged, a problem that the high-brightness part is whiteout or the low-brightness part is blackout arises.

In order to solve the problem, a method of enlarging the apparent DR of an image to be output from the image sensor by imaging plural images with different exposure times and appropriately synthesizing them as one image is widely known those skilled in the art.

Here, as an example, a method of synthesizing two images with different exposure times will be explained.

Hereinafter, of the two images, the image with the longer exposure time will be referred to as "long accumulation image" and the image with the shorter exposure time will be referred to as "short accumulation image", and an image obtained by digital synthesis of the long accumulation image and the short accumulation image will be referred to as "composite image".

FIG. 1 shows an example of a graph showing relationships (hereinafter, referred to as input/output characteristics) between amounts of incident light to an image sensor and output levels with respect to a long accumulation image and a short accumulation image.

Here, 2001 shows an input/output characteristic regarding the long accumulation image and 2002 shows an input/output characteristic regarding the short accumulation image. 2003 shows a level of a component independent of the amount of incident light and an exposure time of noise contained in the output of the image sensor (hereinafter, referred to as "noise level"), and 2005 shows the amount of incident light with which the output level of the long accumulation image starts to saturate.

The long accumulation image has characteristics that the linearity of input and output is broken in a region with a predetermined amount of incident light and the saturation of the output level (=whiteout) occurs, however, the value of the ratio of the output level in the amount of incident light less than that of saturation to the noise level, the so-called S/N-ratio is high.

On the other hand, the short accumulation image has characteristics that the output level relative to the same amount of incident light is lower than that of the long accumulation image and the S/N is deteriorated, however, saturation is hard to occur even when the amount of incident light becomes larger.

FIG. 2 shows an example of a graph showing relationships (hereinafter, referred to as input/output characteristics regarding a composite image) between an amount of incident light and an output level of a composite image when a long accumulation image and a short accumulation image are synthesized and output as one composite image.

Here, 2104 shows an input/output characteristic regarding the composite image, and 2106, 2107 respectively show ranges of the amount of incident light in which the long accumulation image and the short accumulation image are selected in the composite image. 2001, 2002 are equivalent to those denoted by the same signs in FIG. 1, and their explanation will be omitted. Note that, as below, those denoted by the same signs are equivalent and their explanation will be made only once.

The synthesizing method shown in FIG. 2 selects the long accumulation image for a region with the amount of incident light less than a predetermined threshold value INP (a region shown by a range of an amount of incident light 2106) and a multiplication of the short accumulation image by an exposure ratio for a region with the amount of incident light equal to or more than the predetermined threshold value INP (a region shown by a range of an amount of incident light 2107). Thereby, the composite image is generated.

Here, the exposure ratio is a ratio of an amount of exposure of the long accumulation image to an amount of exposure of the short accumulation image, and the ratio of exposure times of the long accumulation image and the short accumulation image unless the long accumulation image and the short accumulation image are multiplied by different gains.

Further, the predetermined threshold value INP is generally set to the point slightly lower than the point at which the output level of the long accumulation image is saturated as shown in the drawing. For example, it is set to the point of about 50% to 80% of the amount of incident light with which the saturation is started.

The following other synthesizing methods are known as known technologies.

First, there is a method of employing ((short accumulation image)×(predetermined gain) (<exposure ratio)+(predetermined offset)) as an output of a region with the amount of incident light equal to or more than the predetermined threshold value INP (the long accumulation image is used for the range with the amount of incident light less than the predetermined threshold value INP).

Second, there is a method of mixing the long accumulation image and the short accumulation image near the boundary between the region using the long accumulation image and the region using the short accumulation image in the various synthesizing methods.

However, using these synthesizing methods, new problems arise.

FIG. 3 shows an example of a graph showing relationships (hereinafter, referred to as S/N characteristics of a composite image) between an amount of incident light and an S/N of a composite image when the synthesizing method shown in FIG. 2 is used.

Here, 2201 shows an S/N characteristic of the composite image, 2202 shows a point at which a region in which the long accumulation image is selected and a region in which the short accumulation image is selected are switched in the composite image, 2203 shows an S/N characteristic of the long accumulation image before synthesis, and 2204 shows an S/N characteristic of the short accumulation image before synthesis.

Here, the S/N characteristic 2203 of the long accumulation image before synthesis is depicted to the amount of incident light with which the output level of the long accumulation image is saturated.

The output level of the short accumulation image is 1/(exposure ratio) times the output level of the long accumulation image, however, the noise level differs little. Further, even when the short accumulation image is multiplied by the exposure ratio, both the output level and the noise level increase and the S/N does not change.

Accordingly, it is known that, in the region near the point 2202 at which the short accumulation image is started to be selected for the composite image, i.e., the region in which the relatively low-brightness part of the short accumulation image is used for output, the S/N extremely deteriorates. The deterioration of S/N is more significant when the exposure ratio is larger.

Further, for the purpose of effectively enlarging DR, the exposure control of the long accumulation image and the short accumulation image may be performed in the respective following manners.

The long accumulation image is obtained by exposure to light with higher brightness than average (backlight correction exposure control) for reduction of blackout.

The short accumulation image is obtained by exposure to light with lower brightness than average (excessive direct light correction exposure control) for reduction of whiteout.

Here, the exposure control refers to an operation of computing an exposure control evaluation value (hereinafter, referred to as "evaluation value") using a predetermined method from respective images and controlling the exposure time, an aperture of the iris, an amount of PGA gain, etc. so that the evaluation value may be equal to a predetermined target level REF.

As below, for simplicity, only the control of the exposure time will be explained.

In a standard exposure control, for example, an integration of brightness values of images or an average obtained by dividing it by the number of pixels is used as the evaluation value.

On the other hand, in the backlight correction exposure control and the excessive direct light correction exposure control, for example, the evaluation value is obtained by dividing images into plural classes with respect to each brightness level and integrating brightness values with different weights for the classes.

Note that the control using the same weight for all classes is the control equivalent to the standard exposure control.

The backlight correction exposure control may be realized by setting the weights for the lower brightness classes larger and, contrary, the excessive direct light correction exposure control may be realized by setting the weights for the higher brightness classes larger.

Under the exposure control, the exposure ratio varies in the following fashions in response to the DR of scenes.

In a scene with the wider DR, the exposure ratio of the long accumulation image to the short accumulation image becomes larger.

In a scene with the narrower DR, the exposure ratio of the long accumulation image and to the short accumulation image becomes smaller. Ultimately, the ratio becomes one, that is, the exposure times of the long accumulation image and the short accumulation image become the same.

However, in the case where the longer and the shorter exposure are performed totally at twice in one field (or one frame) for the purpose of not lowering the moving picture resolution, for the short accumulation image, it may be occasionally necessary to perform exposure in a V-blanking period due to limitations of devices.

In this case, the upper limit of the exposure time (the longest exposure time) is extremely shorter than that of the long accumulation image, and, in the case where imaging is performed using a PAL method, for example, the longest exposure time of the long accumulation image is about $1/50$ seconds and the longest exposure time of the short accumulation image is about $1/1000$ seconds.

When the imaging scene becomes darker, through the exposure control, the exposure times of the long accumulation image and the short accumulation image eventually becomes closer to their longest exposure times, and this means that, even when the DR of the scene is narrow, the exposure ratio of about 20 times is provided with low illuminance.

That is, in the scene of narrow DR and low illuminance, there is no advantage of synthesis of the long accumulation image and the short accumulation image, and the S/N of the region in which the low-brightness part of the short accumulation image is only further deteriorated.

In view of the situation, for example, in a technology described in Patent Document 1 (JP-A-2000-69355) (hereinafter, referred to as Related Art 1), a method of reducing the noise by applying a predetermined filter to the region using the low-brightness part of the short accumulation image in the composite image is proposed.

Further, as another method of enlarging DR, there is a method of synthesizing two pixels different not in exposure time but in sensitivity, however, the same problems occur in the method of enlarging DR.

As a method of solving the problems, a technology described in Patent Document 2 (JP-A-2004-222182) (hereinafter, referred to as Related Art 2) is known.

In Related Art 2, when the exposure time becomes equal to or more than a predetermined time, the local noise in the composite image is reduced using only high-sensitive pixels.

SUMMARY OF THE INVENTION

However, in the two related arts, there are the following problems, respectively.

In Related Art 1, as the exposure ratio becomes larger, the noise level of the short accumulation image becomes higher in response, and, to reduce it, the intensity of the filter to be applied should be made higher and the perceived resolution of a partial region of the composite image becomes extremely lower.

Especially, in a dark scene, the short accumulation exposure does not converge due to limitations of the short accumulation exposure time, and accordingly, an unreasonably high exposure ratio relative to the DR that the scene originally has is provided, and the tendency becomes significant.

Further, only the partial region in the composite image is filtered, and unnaturalness may appear in the composite image.

In Related Art 2, since the exposure control is not particularly changed between the situation in which both high-sensitivity pixels and low-sensitivity pixels are used and the situation in which only high-sensitivity pixels are used, even when the entire screen is dark, whiteout occurs again in the scene with the wider DR.

Thus, it is desirable to provide an image processing apparatus, a camera system, an image processing method, and a program that can reduce noise at a boundary of synthesis that is easily generated in a low-illuminance scene.

An image processing apparatus according to an embodiment of the invention includes an image sensor that is exposed to light, images, and outputs at least two images of a long accumulation image with a longer exposure time and a short accumulation image with a shorter exposure time in one field, a first long accumulation evaluation value computation unit that computes an exposure evaluation value from the long accumulation image and outputs the value as a first long accumulation evaluation value, a second long accumulation evaluation value computation unit that computes an exposure evaluation value from the long accumulation image according to a different method from that of the first long accumulation evaluation value computation unit, and outputs the value as a second long accumulation evaluation value, a short accumulation evaluation value computation unit that computes an exposure evaluation value from the short accumulation image and outputs the value as a short accumulation evaluation value, a short accumulation exposure control unit that acquires a short accumulation target exposure time and short accumulation exposure control information from the short accumulation evaluation value and a first target level, a long accumulation evaluation value synthesis unit that acquires a long accumulation evaluation value by synthesizing the first long accumulation evaluation value and the second long accumulation evaluation value in response to the short accumulation target exposure time using a predetermined method, a long accumulation exposure control unit that acquires long accumulation exposure control information from the long accumulation evaluation value and a second target level, and a synthesis unit that generates one image from the long accumulation image and the short accumulation image in response to the long accumulation exposure control information and the short accumulation exposure control information.

A camera system according to another embodiment of the invention includes an image processing apparatus including an image sensor, and an optical system that forms a subject image in the image sensor, wherein the image processing apparatus includes an image sensor that is exposed to light, images, and outputs at least two images of a long accumulation image with a longer exposure time and a short accumulation image with a shorter exposure time in one field, a first long accumulation evaluation value computation unit that computes an exposure evaluation value from the long accumulation image and outputs the value as a first long accumulation evaluation value, a second long accumulation evaluation value computation unit that computes an exposure evaluation value from the long accumulation image according to a different method from that of the first long accumulation evaluation value computation unit, and outputs the value as a second long accumulation evaluation value, a short accumulation evaluation value computation unit that computes an exposure evaluation value from the short accumulation image and outputs the value as a short accumulation evaluation value, a short accumulation exposure control unit that acquires a short accumulation target exposure time and short accumulation exposure control information from the short accumulation evaluation value and a first target level, a long accumulation evaluation value synthesis unit that acquires a long accumulation evaluation value by synthesizing the first long accumulation evaluation value and the second long accumulation evaluation value in response to the short accumulation target exposure time using a predetermined method, a long accumulation exposure control unit that acquires long accumulation exposure control information from the long accumulation evaluation value and a second target level, an image sensor drive unit that drives the image sensor from the long accumulation exposure control information and the short accumulation exposure control information, and a synthesis unit that generates one image from the long accumulation image and the short accumulation image in response to the long accumulation exposure control information and the short accumulation exposure control information.

An image processing method according to still another embodiment of the invention includes the steps of an imaging step of at least imaging two images of a long accumulation image with a longer exposure time and a short accumulation image with a shorter exposure time in one field, a first long accumulation evaluation value computation step of computing an exposure evaluation value from the long accumulation image to obtain a first long accumulation evaluation value, a second long accumulation evaluation value computation step of computing an exposure evaluation value from the long accumulation image according to a different method from that of the first long accumulation evaluation value computation step to obtain a second long accumulation evaluation value, a short accumulation evaluation value computation step of computing an exposure evaluation value from the short accumulation image to obtain a short accumulation evaluation value, a short accumulation exposure control step of obtaining a short accumulation target exposure time and short accumulation exposure control information from the short accumulation evaluation value and a first target level, a long accumulation evaluation value synthesis step of obtaining a long accumulation evaluation value by synthesizing the first long accumulation evaluation value and the second long accumulation evaluation value in response to the short accumulation target exposure time using a predetermined method, a long accumulation exposure control step of acquiring long accumulation exposure control information from the long accumulation evaluation value and a second target level, and a synthesis step of generating one image from the long accumulation image and the short accumulation image in response to the long accumulation exposure control information and the short accumulation exposure control information.

A program according to yet another embodiment of the invention allows a computer to execute image processing of imaging processing of at least imaging two images of a long accumulation image with a longer exposure time and a short accumulation image with a shorter exposure time in one field, first long accumulation evaluation value computation processing of computing an exposure evaluation value from the long accumulation image to obtain a first long accumulation evaluation value, second long accumulation evaluation value computation processing of computing an exposure evaluation value from the long accumulation image according to a different method from that of the first long accumulation evaluation value computation processing to obtain a second long accumulation evaluation value, short accumulation evaluation value computation processing of computing an exposure evaluation value from the short accumulation image to obtain a short accumulation evaluation value, short accumulation exposure control processing of obtaining a short accumulation target exposure time and short accumulation exposure control information from the short accumulation evaluation value and a first target level, long accumulation evaluation value synthesis processing of obtaining a long accumulation evaluation value by synthesizing the first long accumulation evaluation value and the second long accumulation evaluation value in response to the short accumulation target exposure time using a predetermined method, long accumulation exposure control processing of obtaining long accumulation exposure control information from the long accumulation evaluation value and a second target level, and synthesis processing of generating one image from the long accumulation image and the short accumulation image in response to the long accumulation exposure control information and the short accumulation exposure control information.

According to the embodiments of the invention, the noise at the boundary of synthesis that is easily generated in the low-illuminance scene may be reduced.

DESCRIPTION OF PREFERRED INVENTION

As below, embodiments of the invention will be explained with reference to the drawings.

The explanation will be made in the following order.
1. First Embodiment (First configuration example of image processing apparatus)
2. Second Embodiment (Second configuration example of image processing apparatus)
3. Third Embodiment (Third configuration example of image processing apparatus)
4. Fourth Embodiment (Configuration example of camera system)

1. First Embodiment

Figure 4:
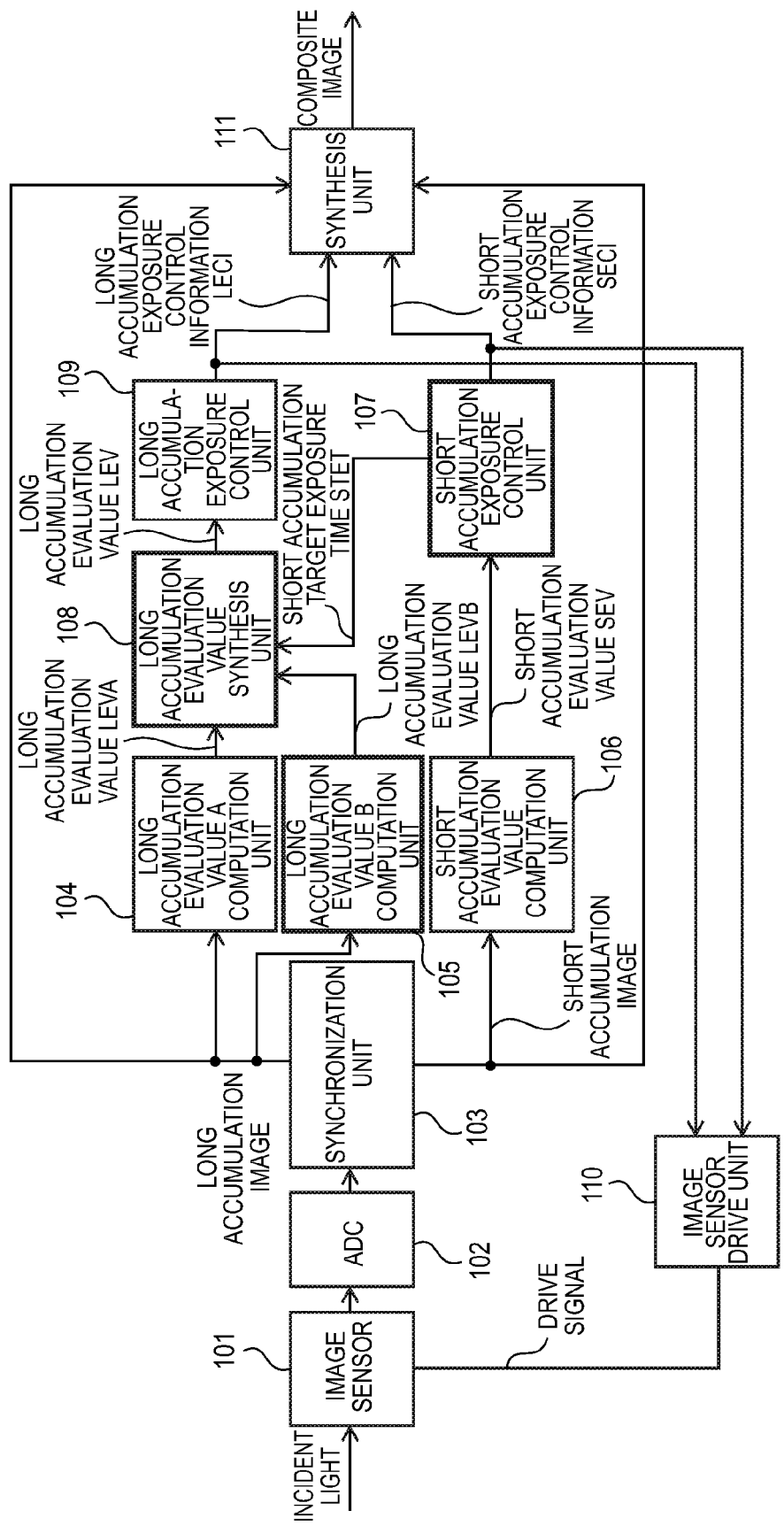
FIG. 4 is a block diagram showing a configuration example of an image processing apparatus according to a first embodiment of the invention.

FIG. 4 is a block diagram showing a configuration example of an image processing apparatus according to the first embodiment of the invention.

The image processing apparatus 100 has an image sensor 101, an analog/digital conversion unit (ADC: analog digital converter) 102, a synchronization unit 103, a first long accumulation evaluation value (A) computation unit 104, and a second long accumulation evaluation value (B) computation unit 105.

The image processing apparatus 100 has a short accumulation evaluation value computation unit 106, a short accumulation exposure control unit 107, a long accumulation evaluation value synthesis unit 108, a long accumulation exposure control unit 109, an image sensor drive unit 110, and a synthesis unit 111.

The image sensor 101 converts incident light into an analog signal and outputs it to the downstream ADC 102.

The image sensor 101 is exposed to light, images, and outputs at least two images of a long accumulation image with a longer exposure time and a short accumulation image with a shorter exposure time in one field period.

The ADC 102 A/D-converts the analog signal by the image sensor 101 and outputs it as a digital signal to the downstream synchronization unit 103.

The synchronization unit 103 separates the digital signal by the ADC 102 into the long accumulation image and the short accumulation image.

The synchronization unit 103 outputs the separated long accumulation image to the first long accumulation evaluation value computation unit 104, the second long accumulation evaluation value computation unit 105, and the synthesis unit 111, and outputs the short accumulation image to the short accumulation evaluation value computation unit 106 and the synthesis unit 111.

The first long accumulation evaluation value computation unit 104 computes an exposure evaluation value from the supplied long accumulation image and outputs the computed exposure evaluation value as a first long accumulation evaluation value LEVA to the long accumulation evaluation value synthesis unit 108.

The second long accumulation evaluation value computation unit 105 computes an exposure evaluation value from the supplied long accumulation image according to a different method from that of the first long accumulation evaluation value computation unit 104, and outputs the computed exposure evaluation value as a second long accumulation evaluation value LEVB to the long accumulation evaluation value synthesis unit 108.

The short accumulation evaluation value computation unit 106 computes an exposure evaluation value from the supplied short accumulation image and outputs it as a short accumulation evaluation value SEV to the short accumulation exposure control unit 107.

The short accumulation exposure control unit 107 compares the supplied short accumulation evaluation value SEV to a first target level REF1, and generates a short accumulation target exposure time and exposure control information for the short accumulation image (hereinafter, referred to as "short accumulation exposure control information") in response to a comparison result.

The short accumulation exposure control unit 107 outputs the generated short accumulation target exposure time STET to the long accumulation evaluation value synthesis unit 108, and outputs the generated short accumulation exposure control information SECI to the synthesis unit 111.

The long accumulation evaluation value synthesis unit 108 generates a long accumulation evaluation value LEV in response to the supplied long accumulation evaluation value LEVA, long accumulation evaluation value LEVB, and short accumulation target exposure time STET, and outputs the generated long accumulation evaluation value LEV to the long accumulation exposure control unit 109.

The long accumulation exposure control unit 109 compares the supplied long accumulation evaluation value LEV to a second target level REF 2, generates exposure control information for the long accumulation image (hereinafter, referred to as "long accumulation exposure control information") LECI, and outputs the generated long accumulation exposure control information LECI to the synthesis unit 111.

The image sensor drive unit 110 generates a drive signal in response to the long accumulation exposure control information LECI and the short accumulation exposure control information SECI, and drives the image sensor 101 using the generated drive signal.

The synthesis unit 111 synthesizes the supplied two images of the long accumulation image and the short accumulation image in response to the long accumulation exposure control information LECI and the short accumulation exposure control information SECI, and outputs it to a downstream processing system.

The image processing apparatus 100 having the above described configuration can be arranged to have the following features.

The short accumulation exposure control information SECI generated by the short accumulation exposure control unit 107 and the long accumulation exposure control information LECI generated by the long accumulation exposure control unit 109 contain exposure time information.

The first long accumulation evaluation value computation unit 104 has a function of computing the exposure evaluation value by putting a weight toward the low-brightness side, the second long accumulation evaluation value computation unit 105 has a function of computing the exposure evaluation value by putting a weight toward the high-brightness side, and the short accumulation evaluation value computation unit 106 has a function of computing the exposure evaluation value by putting a weight toward the high-brightness side, respectively.

Further, in the second long accumulation evaluation value computation unit 105 and the short accumulation evaluation value computation unit 106, the weights for computation of the exposure evaluation values are equal.

The first target level REF1 applied in the short accumulation exposure control unit 107 and the second target level REF2 applied in the long accumulation exposure control unit 109 take the same value.

The long accumulation evaluation value synthesis unit 108 takes the long accumulation evaluation value LEVA if the short accumulation target exposure time STET by the short accumulation exposure control unit 107 is less than a first threshold value SHTA, and takes the long accumulation evaluation value LEVB if the short accumulation target exposure time STET is equal to or more than the first threshold value SHTA as the long accumulation evaluation value LEV, respectively.

The first threshold value SHTA is a value exceeding the shortest exposure time of the long accumulation image and the longest exposure time of the short accumulation image.

When an amount of PGA gain in the short accumulation image is larger, the first threshold value SHTA is smaller.

Further, the long accumulation evaluation value synthesis unit 108 takes the long accumulation evaluation value LEVA if the short accumulation target exposure time STET is less than a second threshold value SHTB, and takes the long accumulation evaluation value LEVB if the short accumulation target exposure time STET is equal to or more than a third threshold value SHTC larger than the second threshold value SHTB as the long accumulation evaluation value LEV.

The long accumulation evaluation value synthesis unit 108 takes a value obtained by complementing the long accumulation evaluation value LEVA and the long accumulation evaluation value LEVB using a predetermined method as the long accumulation evaluation value LEV if the short accumulation target exposure time STET is equal to or more than the second threshold value SHTB and less than the third threshold value SHTC.

The second threshold value SHTB is a value exceeding the shortest exposure time of the long accumulation image and the longest exposure time of the short accumulation image.

If the amount of PGA gain in the short accumulation image is larger, the second and the third threshold values SHTB, SHTC are smaller.

Next, an outline of an operation when the image processing apparatus 100 shown in FIG. 4 generates a composite image for one field will be explained.

After the start of processing, the image sensor 101 photoelectrically converts incident light and outputs it as an analog signal to the downstream. In this regard, the image sensor drive unit 110 generates a drive signal for releasing an electronic shutter twice in a total of the longer one and the shorter one in one field period based on the long accumulation exposure control information LECI and the short accumulation exposure control information SECI, and inputs it to the image sensor 101.

Accordingly, the analog signal generated by the image sensor 101 contains information on both the long accumulation image and the short accumulation image.

The analog signal output from the image sensor 101 is converted into a digital signal in the downstream ADC 102, and further, in the downstream synchronization unit 103, separated into the long accumulation image and the short accumulation image and output.

Then, using the separated long accumulation image and short accumulation image, the first long accumulation evaluation value computation unit 104, the second long accumulation evaluation value computation unit 105, the short accumulation evaluation value computation unit 106, the short accumulation exposure control unit 107, the long accumulation evaluation value synthesis unit 108, and the long accumulation exposure control unit 109 generate the long accumulation exposure control information LECI and short accumulation exposure control information SECI necessary for the image sensor drive unit 110 in the next field exposure.

Note that the exposure control information contains at least information on the exposure time of the long accumulation image and the exposure time of the short accumulation image, and contains information on the amount of PGA gain according to need.

The operations of the first long accumulation evaluation value computation unit 104, the second long accumulation evaluation value computation unit 105, the short accumulation evaluation value computation unit 106, the short accumulation exposure control unit 107, the long accumulation evaluation value synthesis unit 108, and the long accumulation exposure control unit 109 will be explained later in detail because they are important.

The synthesis unit 111 synthesizes the long accumulation image and the short accumulation image in parallel to the generation of the long accumulation exposure control information LECI and the short accumulation exposure control information SECI or in a sequential manner, outputs a composite image, and thereby, completes the processing for one field.

Figure 1:
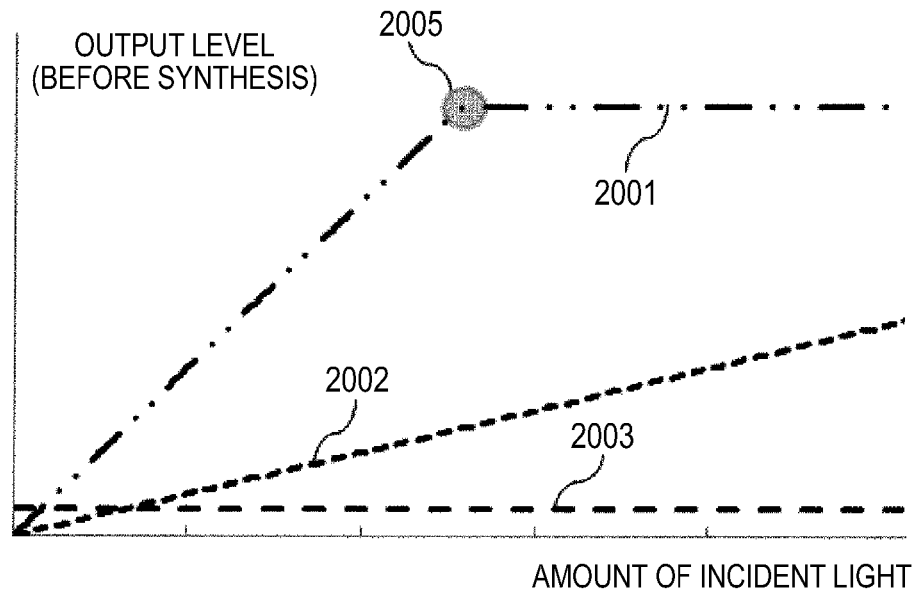
FIG. 1 shows relationships (input/output characteristics) between amounts of incident light to an image sensor and output levels with respect to a long accumulation image and a short accumulation image in a graph.
Figure 2:
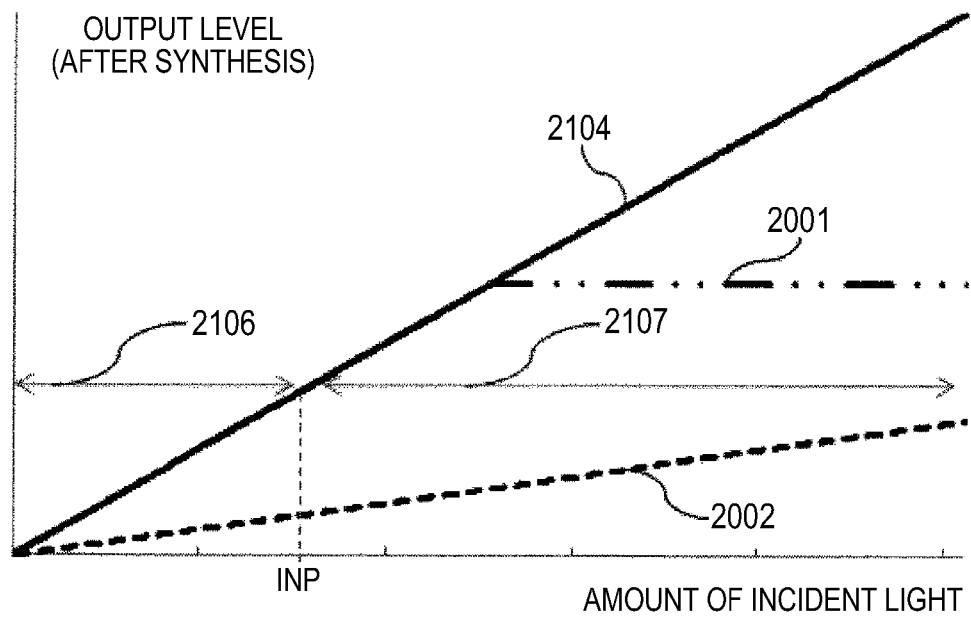
FIG. 2 shows relationships (input/output characteristics regarding a composite image) between an amount of incident light and an output level of a composite image when a long accumulation image and a short accumulation image are synthesized and output as one composite image in a graph.
Figure 3:
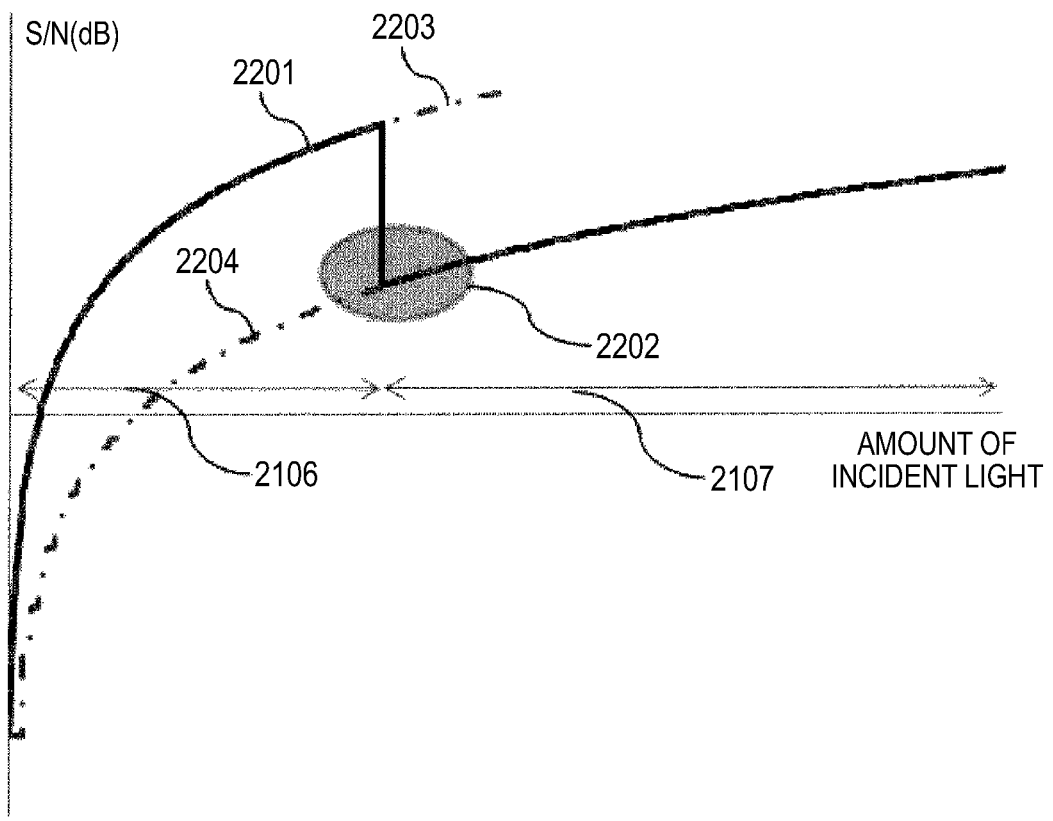
FIG. 3 shows relationships (S/N characteristics of a composite image) between an amount of incident light and an S/N of a composite image when the synthesizing method shown in FIG. 2 is used in a graph.

Note that, in the case where the synthesizing method shown in the graph of FIG. 2 is used, an exposure ratio for multiplication of the short accumulation image is necessary in addition to the long accumulation image and the short accumulation image.

To obtain the exposure ratio, the long accumulation exposure control information and the short accumulation exposure control information obtained in the first long accumulation evaluation value computation unit 104, the second long accumulation evaluation value computation unit 105, the short accumulation evaluation value computation unit 106, the short accumulation exposure control unit 107, the long accumulation evaluation value synthesis unit 108, and the long accumulation exposure control unit 109 may be additionally input to the synthesis unit 111 for computation of the exposure ratio.

Alternatively, processing of integrating brightness values in a predetermined region not saturated in the long accumulation image and brightness values in the predetermined region in the short accumulation image, respectively, and regarding their ratio as the exposure ratio may be performed within the synthesis unit 111.

Next, the detailed operations of the first long accumulation evaluation value computation unit 104, the second long accumulation evaluation value computation unit 105, the short accumulation evaluation value computation unit 106, the short accumulation exposure control unit 107, the long accumulation evaluation value synthesis unit 108, and the long accumulation exposure control unit 109 will be explained.

Figure 5:
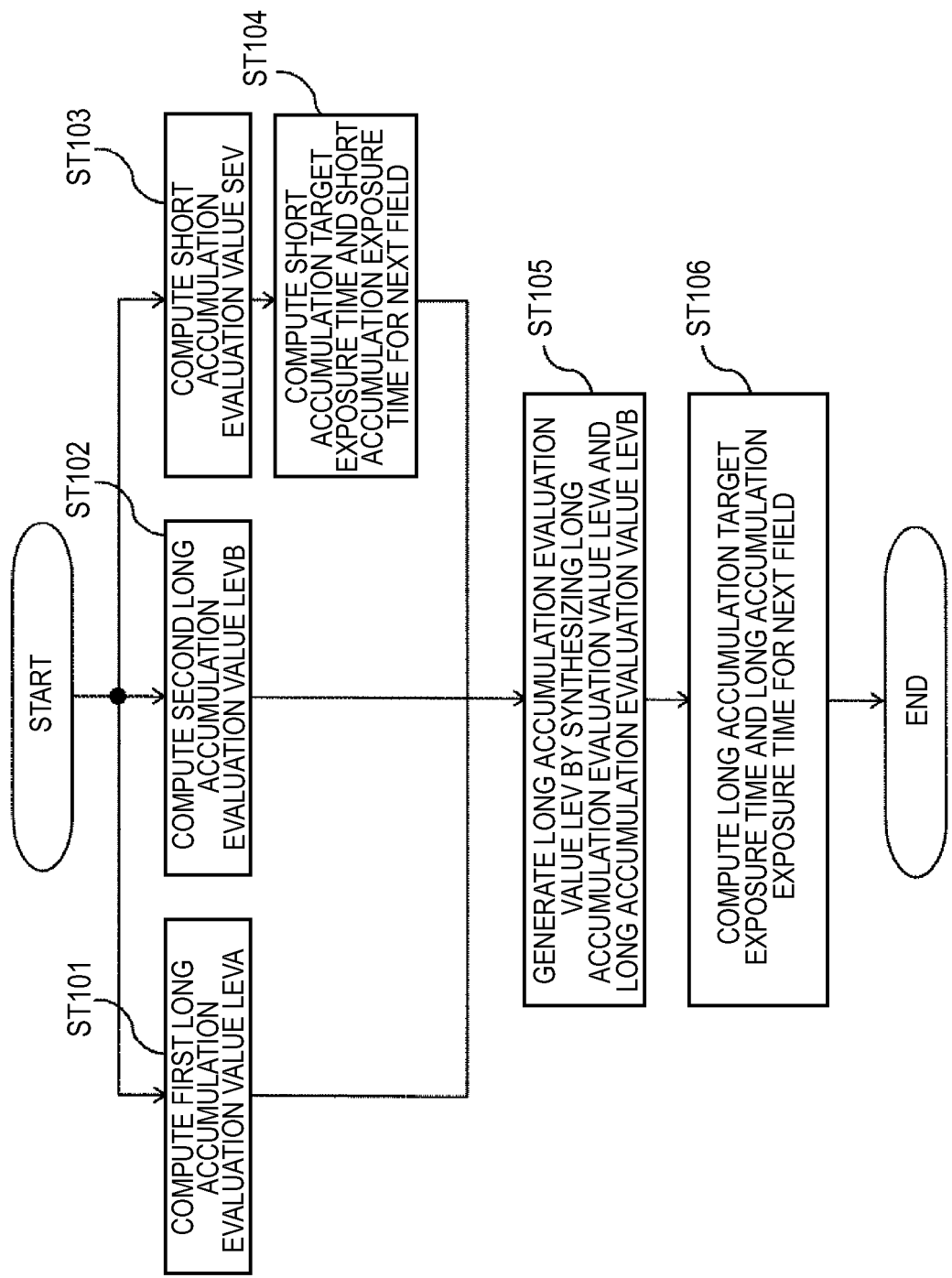
FIG. 5 is a flowchart showing an example of a flow of processing in a first long accumulation evaluation value computation unit, a second long accumulation evaluation value computation unit, a short accumulation evaluation value computation unit, a short accumulation exposure control unit, a long accumulation evaluation value synthesis unit, and a long accumulation exposure control unit.

FIG. 5 is a flowchart showing an example of a flow of processing in the first long accumulation evaluation value computation unit 104, the second long accumulation evaluation value computation unit 105, the short accumulation evaluation value computation unit 106, the short accumulation exposure control unit 107, the long accumulation evaluation value synthesis unit 108, and the long accumulation exposure control unit 109.

After the start of processing, in the first long accumulation evaluation value computation unit 104, the second long accumulation evaluation value computation unit 105, and the short accumulation evaluation value computation unit 106, the first long accumulation evaluation value LEVA, the second long accumulation evaluation value LEVB, and the short accumulation evaluation value SEV are computed, respectively (steps ST101, ST102, ST103).

The processing shown at the three steps may be performed in a simultaneous parallel manner as illustrated, or in a sequential manner in random order.

More specifically, the respective evaluation value computation units 104 to 106 compute the evaluation values according to the following flow, for example.

The brightness values of the respective pixels are obtained from the long accumulation image or the short accumulation image.

The brightness values of the respective pixels are classified with respect to each predetermined brightness range, and integration of the brightness values and counting of the number of pixel values are performed for each class. As below, the brightness integration value of a predetermined class x is INTx and the number of pixels is CNTx (the larger the x, the higher brightness the class has).

The evaluation value EVA is computed by the following formula.

$$EVA = \frac{\sum_{x}(INTx \times WGTx)}{\sum_{x}(CNTx \times WGTx)} \left( \begin{array}{c} WGTx \text{ is weight of class} \\ x \text{ and satisfies } \sum_{x} WGTx = 1 \end{array} \right) \quad (1)$$

Here, the value of the weight WGTx of the class x is set in the following manner according to the type of the evaluation value computation unit.

In the case of the first long accumulation evaluation value computation unit 104, as x is larger in descending order, WGTx is larger.

In the case of the second long accumulation evaluation value computation unit 105, as x is larger in ascending order, WGTx is smaller.

In the case of the short accumulation evaluation value computation unit 106, as x is larger in ascending order, WGTx is smaller.

Note that it is preferable that the values of the respective weights WGTx in the second long accumulation evaluation value computation unit 105 and the short accumulation evaluation value computation unit 106 are the same, and the following explanation will be made on the assumption, however, they may not necessarily be the same.

After the processing at step ST103 is completed, in the short accumulation exposure control unit 107, the short accumulation target exposure time STET and the short accumulation image exposure control information SECI are generated from the short accumulation evaluation value SEV and the first target level REF1, and output them to the downstream (step ST104).

More specifically, for example, the following processing is performed.

A ratio of the short accumulation evaluation value SEV to the first target level REF1 is obtained. The value of the ratio is referred to as RS.

(exposure time used for exposure in current field)/RS is computed, and used as the short accumulation target exposure time of the scene.

The short accumulation target exposure time STET itself or the one smoothed by application of an IIR filter or the like to the short accumulation target exposure time STET is used as the exposure time in the next field.

The amount of PGA gain or the like is added to the exposure time according to need, and the short accumulation image exposure control information is obtained and output together with the short accumulation target exposure time to the synthesis unit 111 and the image sensor drive unit 110.

That is, through the processing at steps ST103, ST104, the exposure control is performed on the short accumulation image constantly based on the concept of excessive direct light correction. This behavior is the same as the exposure control in the related arts.

All of the processing at steps ST101, ST102, ST104 is completed, the long accumulation evaluation value synthesis unit 108 generates the long accumulation evaluation value LEV by synthesizing the values of the first long accumulation evaluation value LEVA and the second long accumulation evaluation value LEVB in response to the short accumulation target exposure time STET (step ST105). The long accumulation evaluation value synthesis unit 108 outputs the generated long accumulation evaluation value LEV to the long accumulation exposure control unit 109.

Figure 6:
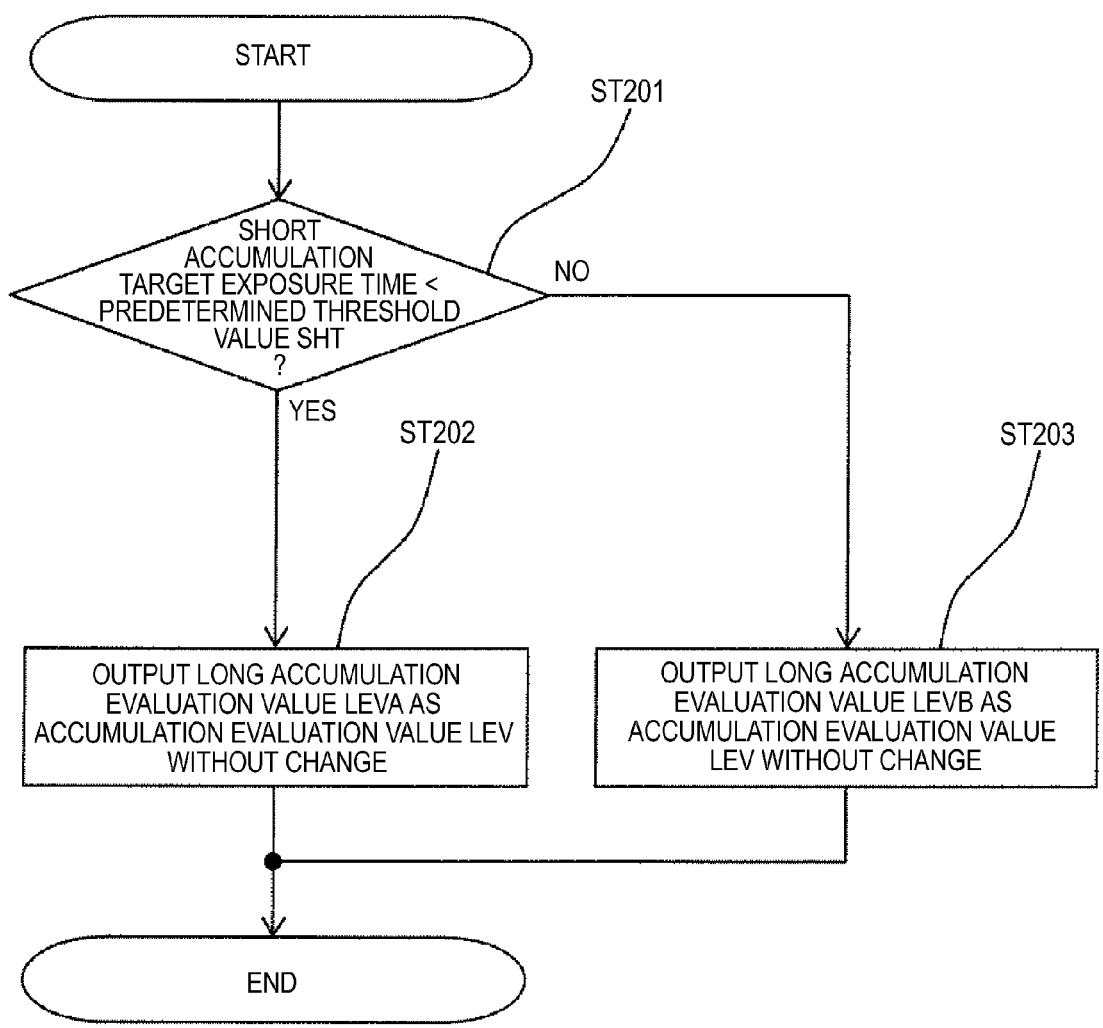
FIG. 6 is a flowchart showing an example of detailed processing in the long accumulation evaluation value synthesis unit.

FIG. 6 is a flowchart showing an example of detailed processing in the long accumulation evaluation value synthesis unit 108.

After the start of processing, the long accumulation evaluation value synthesis unit 108 checks the magnitude relation between the short accumulation target exposure time STET and a threshold value SHT (step ST201). Here, the predetermined threshold value SHT satisfies the following relation.

(threshold value SHT)>(longest exposure time of short accumulation image(MAXLET))  (2)

If the short accumulation target exposure time STET is less than the threshold value SHT (step ST201/YES), the first long accumulation evaluation value LEVA is output without change as the long accumulation evaluation value LEV to the downstream long accumulation exposure control unit 109 (step ST202), and the processing is ended.

On the other hand, if the short accumulation target exposure time STET is equal to or more than the threshold value SHT (step ST201/NO), the second long accumulation evaluation value LEVB is output without change as the long accumulation evaluation value LEV to the downstream long accumulation exposure control unit 109 (step ST203), and the processing is ended.

After the processing at step ST105 in FIG. 5 is completed, in the long accumulation exposure control unit 109, the long accumulation target exposure time and the long accumulation image exposure control information LECI are generated from the long accumulation evaluation value LEV and the second target level REF2, output to the downstream (step ST106), and the processing is ended.

More specifically, for example, the following processing is performed (as is the case of the short accumulation image).

The ratio of the long accumulation evaluation value LEV to the second target level REF2 is obtained. The value of the ratio is referred to as RL.

(exposure time used for exposure in current field)/RL is computed, and used as the long accumulation target exposure time of the scene.

The long accumulation target exposure time itself or the one smoothed by application of an IIR filter or the like to the long accumulation target exposure time is used as the exposure time in the next field.

The amount of PGA gain or the like is added to the exposure time according to need, and the long accumulation image exposure control information is obtained and output to the synthesis unit 111 and the image sensor drive unit 110.

Here, it is preferable that the second target level REF2 is equal to the value of the first target level REF1 used in the processing of the short accumulation exposure control unit 107 and the following explanation will be made on the assumption, however, they may not necessarily be the same.

Through the processing at steps ST101, ST102, ST105, ST106 in FIG. 5, the exposure control of the long accumulation image is as follows.

If (short accumulation target exposure time)<(threshold value SHT), the exposure control is performed based on the concept of backlight correction.

In the case where the exposure time of the short accumulation image may reach the short accumulation target exposure time or the vicinity, that is, the scene is sufficiently light, the long accumulation image behaves in the same manner as in the existing image processing apparatus.

If (short accumulation target exposure time)≥(threshold value SHT), the exposure control is performed based on the concept of excessive direct light correction. Even in the case where the exposure time of the short accumulation image may be impossible to reach the short accumulation target exposure time due to limitations of devices, that is, the scene is too dark, the longer exposure time may be set for the long accumulation image.

Accordingly, the exposure, which should be performed in the short accumulation image in a normal situation, is realized in the long accumulation image instead.

Note that, since the exposure is performed under the darker condition than that for the long accumulation image in the existing image processing apparatus, it is necessary to ensure that the threshold value SHT may not be set shorter than the shortest exposure time of the long accumulation image.

From the above explanation, the difference between the exposure control in the existing image processing apparatus and the exposure control in the image processing apparatus 100 according to the first embodiment is only the following point.

The exposure control of the long accumulation image if (short accumulation target exposure time)≥(predetermined threshold value SHT) may be regarded as follows.

In the case of the existing image processing apparatus, it may be regarded as the backlight correction exposure control.

In the case of the image processing apparatus 100 according to the first embodiment, it may be regarded as the excessive direct light correction exposure control, that is, it may be regarded as the same exposure control as that for the short accumulation image.

Next, the effect provided by the difference of the exposure controls will be explained as below.

Regarding the short accumulation target exposure time, a scene that satisfies the following relation is assumed.

(short accumulation target exposure time STET≥
(threshold value SHT), (longest exposure time of short accumulation image)
(MAXSET)<(short accumulation target exposure
time)(STET)<(longest exposure time of long
accumulation image)(MAXLET)

Note that the input/output characteristics regarding the long accumulation image, the short accumulation image, and the composite image in the assumed scene when the existing image processing apparatus is used are the those in FIG. 2 explained as above.

In the assumed scene, the exposure control of the long accumulation image in the image processing apparatus 100 according to the first embodiment is performed in the following manner.

The exposure is performed under the darker condition than that for the long accumulation image in the existing image processing apparatus (the exposure time is shorter).

The exposure is performed under the lighter condition than that for the short accumulation image (the exposure time is longer). This is because the same exposure control is performed for the long accumulation image and the short accumulation image, however, the exposure for the short accumulation image has not converge due to limitations of the longest exposure time.

Figure 7:
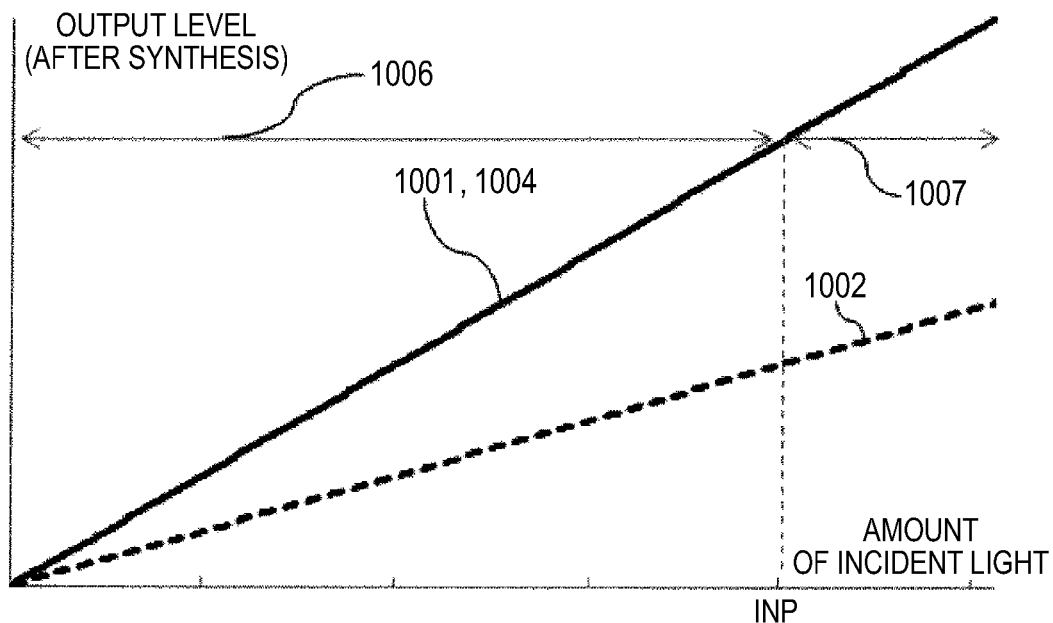
FIG. 7 shows an input/output characteristic regarding a long accumulation image, an input/output characteristic regarding a short accumulation image, and an input/output characteristic regarding a composite image in the assumed scene when the image processing apparatus according to the first embodiment of the invention is used in a graph.

FIG. 7 is an example of a graph showing an input/output characteristic regarding a long accumulation image, an input/output characteristic regarding a short accumulation image, and an input/output characteristic regarding a composite image in the assumed scene when the image processing apparatus according to the first embodiment of the invention is used.

Here, 1001 shows an input/output characteristic regarding a long accumulation image, 1002 shows an input/output characteristic regarding a short accumulation image, 1004 shows an input/output characteristic regarding a composite image, and 1006, 1007 respectively show ranges of the amount of incident light in which the long accumulation image and the short accumulation image are selected in the composite image.

Note that, in FIG. 7, the input/output characteristic 1001 regarding the long accumulation image and the input/output characteristic 1004 regarding the composite image are completely the same because the exposure control of the long accumulation image and the exposure control of the short accumulation image are the same and saturation does not occur even in the high-brightness region of the long accumulation image.

Further, from this, the range of the amount of incident light in which the long accumulation image is selected is wider in the composite image.

Figure 8:
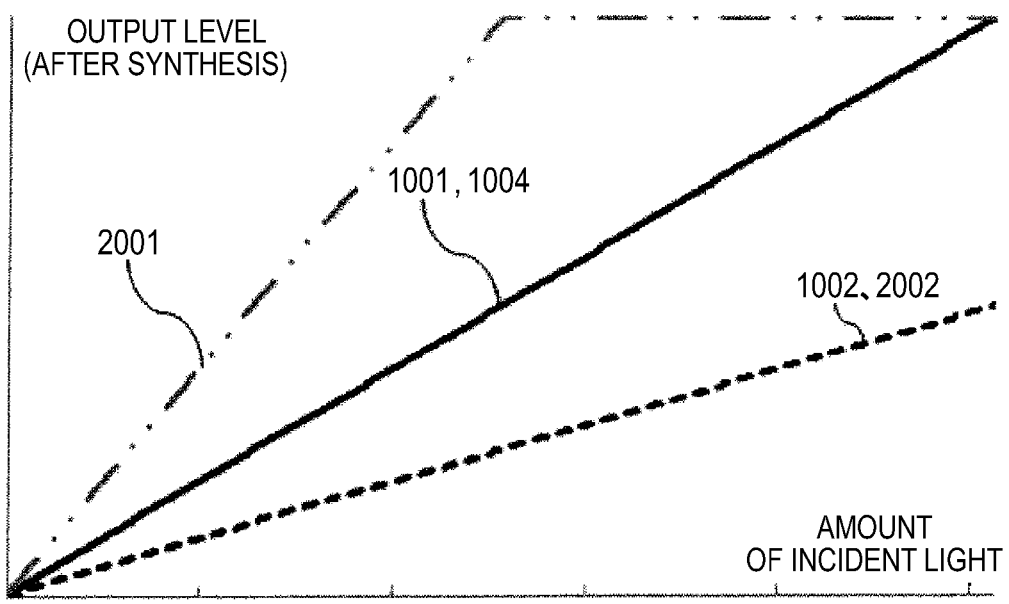
FIG. 8 shows plots of the respective input/output characteristics shown in FIG. 7 and the input/output characteristics shown in FIG. 2 in combination for comparison between the image processing apparatus according to the first embodiment and an existing image processing apparatus.

FIG. 8 shows plots of the respective input/output characteristics shown in FIG. 7 and the input/output characteristics shown in FIG. 2 in combination for comparison between the image processing apparatus according to the first embodiment and the existing image processing apparatus.

There is no difference in input/output characteristic regarding the short accumulation image between the existing image processing apparatus and the image processing apparatus 100 according to the first embodiment, and thus, the input/output characteristic 1002 and the input/output characteristic 2102 are completely the same.

Further, it is known that the input/output characteristic regarding the long accumulation image in the image processing apparatus 100 according to the first embodiment has an intermediate characteristic between the input/output characteristic regarding the long accumulation image and the input/output characteristic regarding the short accumulation image of the existing image processing apparatus.

Figure 9:
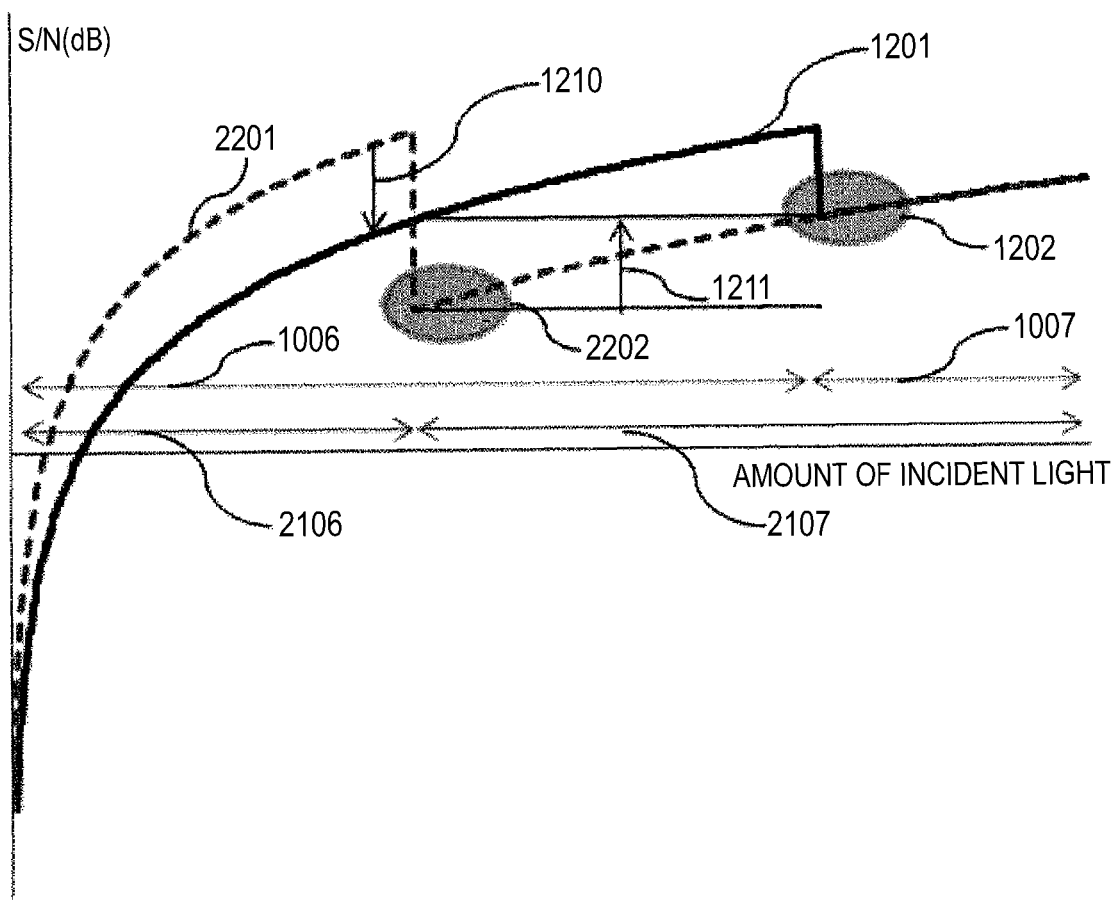
FIG. 9 is a graph for comparison between S/N characteristics of composite images in the image processing apparatus according to the first embodiment and the existing image processing apparatus.

FIG. 9 is a graph for comparison between S/N characteristics of composite images in the image processing apparatus according to the first embodiment and the existing image processing apparatus.

Here, 1201 shows the relationship in the image processing apparatus 100 according to the first embodiment, 1202 shows a point at which a region in which the long accumulation image is selected and a region in which the short accumulation image is selected are switched in the composite image output by the image processing apparatus according to the first embodiment.

From FIG. 9, it is known that the S/N characteristic of the composite image of the image processing apparatus 100 according to the first embodiment has the following difference from the existing image processing apparatus.

Since the long accumulation image is obtained by exposure under the dark condition, the S/N of the low-brightness part is lower. The amount of lowering of the S/N is shown by sign 1210 in FIG. 9.

Although the exposure of the short accumulation image is the same, the point at which the region in which the long accumulation image is selected and the region in which the short accumulation image is selected are switched in the composite image is shifted toward the high-brightness side, and thus, the S/N at the switching point is improved.

The amount of improvement of the S/N is shown by sign 1211 in FIG. 9.

That is, the image processing apparatus 100 according to the first embodiment has the following advantages over the image processing apparatus described in Related Art 1.

In the low-illuminance scene, the S/N lowering of the high-brightness part in the composite image is reduced. Instead, a side effect of lowering of the S/N of the low-brightness part is produced, however, the side effect may be eliminated together with the S/N lowering remaining at the high-brightness side by applying a weak filter to the entire screen.

It is not necessary to apply a strong filter only a part of the screen, unnaturalness that might appear at the boundary between the region in which the long accumulation image is selected and the region in which the short accumulation image is selected in the composite image is not produced.

Regardless to add, it is obvious that a composite image with higher image quality in both scenes with high illuminance and low illuminance may be obtained using the technologies according to Related Art 1 and the first embodiment in combination.

Note that, though the S/N lowering of the low-brightness part has been described as the side effect of the image processing apparatus 100 according to the first embodiment of the invention, this does not necessarily occur under the following condition.

The condition is that gain-up by the PGA gain is performed in the scene in which the illuminance is extremely low and the exposure control does not converge even in the longest exposure time of the long accumulation image, and the threshold value SHT that satisfies (threshold value SHT)≥(longest exposure time of long accumulation image) is set.

Under the condition, (short accumulation target exposure time)≥(predetermined threshold value SHT) is satisfied, and, even when the exposure control of the long accumulation image is switched to the exposure control of the short accumulation image, "exposure time" of the long accumulation image does not change but remains the longest exposure time of the long accumulation image, and only "amount of PGA gain" becomes lower.

However, particularly, in the case where digital gain is used as a method of PGA gain, even when the amount of PGA gain changes, the S/N of the output level does not change and the S/N lowering before and after the switching of the exposure control of the long accumulation image does not occur.

On the other hand, in the case where the PGA gain is used for the exposure control of the short accumulation image, even when the scene has low illuminance, the short accumulation target exposure time may not necessarily be longer.

For example, in the following two cases, the amounts of exposure of the short accumulation image are basically the same, however, the S/N is overwhelmingly worse in the former case.

In the first case, the exposure time of the short accumulation image is 1/2000 seconds and the PGA gain is 10 times (=using PGA gain).

In the second case, the exposure time of the short accumulation image is 1/200 seconds and the PGA gain is single (=using no PGA gain).

That is, it is risky to switch the exposure control of the long accumulation image only by the comparison between the short accumulation target exposure time and the predetermined threshold value SHT. In the above described cases, it is preferable to compare the short accumulation target exposure time to a value obtained by dividing the predetermined threshold value SHT by the amount of PGA gain.

2. Second Embodiment

Next, the second embodiment of the invention will be explained.

Figure 10:
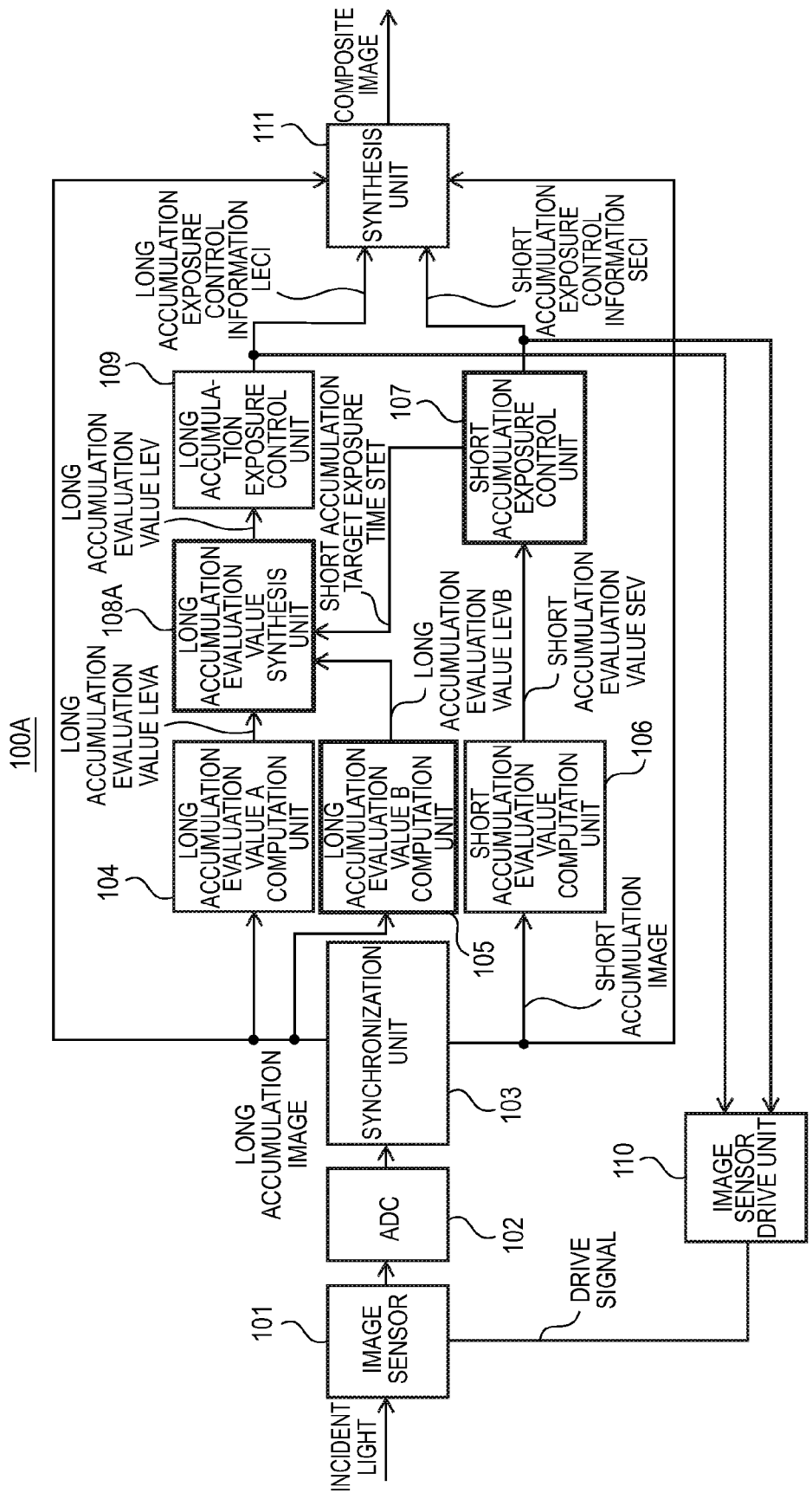
FIG. 10 is a block diagram showing a configuration example of an image processing apparatus according to a second embodiment of the invention.

FIG. 10 is a block diagram showing a configuration example of an image processing apparatus according to the second embodiment of the invention.

The image processing apparatus 100A in the second embodiment of the invention is different from the image processing apparatus 100 in the first embodiment of the invention in the function of the long accumulation evaluation value synthesis unit only. FIG. 10 and FIG. 4 are not different as the block configurations.

Accordingly, here, only the difference of the operation will be explained.

Figure 11:
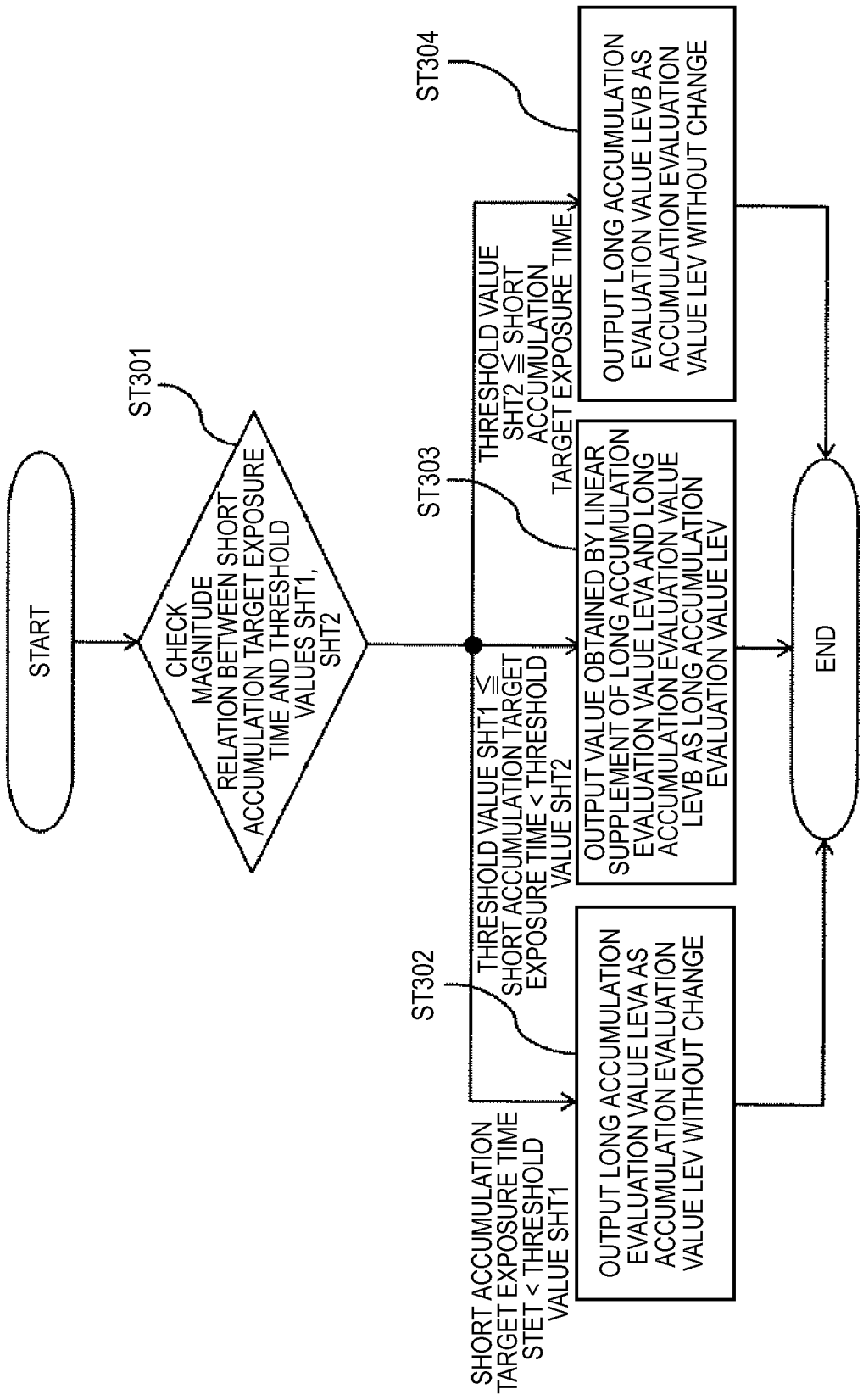
FIG. 11 is a flowchart showing an example of processing of a long accumulation evaluation value synthesis unit in the image processing apparatus according to a second embodiment of the invention in a graph.

FIG. 11 is a flowchart showing an example of processing of a long accumulation evaluation value synthesis unit 108A in the image processing apparatus 100A according to the second embodiment of the invention.

After the start of processing, the long accumulation evaluation value synthesis unit 108A checks the magnitude relation between the short accumulation target exposure time STET and a threshold value SHT1 and a threshold value SHT2 (step ST301). Here, it is assumed that (predetermined threshold value SHT1)<(predetermined threshold value SHT2).

If (short accumulation target exposure time STET)< (threshold value SHT1), the first long accumulation evaluation value LEVA is output without change as the long accumulation evaluation value LEV to the downstream (step ST302), and the processing is ended.

If (threshold value SHT1)≤(short accumulation target exposure time STET)<(predetermined threshold value SHT2), a value obtained by supplement of the first long accumulation evaluation value LEVA and the second long accumulation evaluation value LEVB is output as the long accumulation evaluation value LEV to the downstream (step ST303), and the processing is ended.

If (threshold value SHT2)≤(short accumulation target exposure time STET), the second long accumulation evaluation value LEVB is output without change as the long accumulation evaluation value LEV to the downstream (step ST304), and the processing is ended.

As an example of the supplement method at step ST303, linear supplement is cited, and its formula is expressed as follows.

$$\text{(long accumulation evaluation value LEV)} = \text{(long accumulation evaluation value LEVA)} \times (1-K) + \text{(long accumulation evaluation value LEVB)} \times K \quad (3)$$

(Here, K=(short accumulation target exposure time−SHT1)/ (SHT2−SHT1))

Figure 12:
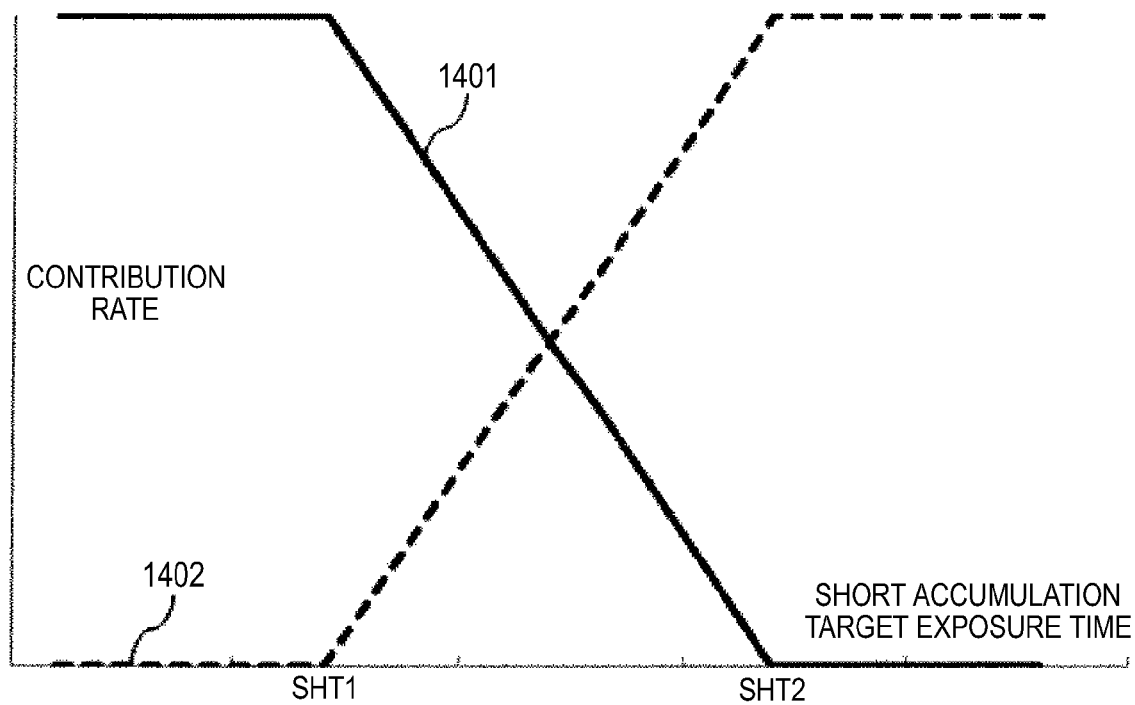
FIG. 12 shows how contribution rates of a first long accumulation evaluation value and a second long accumulation evaluation value change in response to a short accumulation target exposure time according to the processing flow shown in FIG. 11.

FIG. 12 is a graph showing how contribution rates of the first long accumulation evaluation value LEVA and the second long accumulation evaluation value LEVB change in response to the short accumulation target exposure time according to the processing flow shown in FIG. 11.

In FIG. 12, 1401 shows the contribution rate of the long accumulation evaluation value A and 1402 shows the contribution rate of the long accumulation evaluation value B, respectively.

According to the image processing apparatus 100 according to the first embodiment, the computing methods of the long accumulation evaluation value LEV have been digitally switched by comparison between one threshold value SHT to the short accumulation target exposure time.

Accordingly, in the scene in which the short accumulation target exposure time and the threshold value SHT are very close to each other, a phenomenon, so-called hunting that the computing methods of the two long accumulation evaluation values are frequently switched due to a slight change of the subject and noise may occur.

At the same time, when the exposure time of the long accumulation image is obtained in the long accumulation exposure control unit 109, an IIR filter having a significantly long time constant is applied to the long accumulation target exposure time, and the phenomenon does not emerge as hunting of the exposure control of the long accumulation image.

However, in the case where the time constant is desired to be made shorter for the purpose of increasing the convergence speed of the exposure control, the phenomenon may be problematic in the image processing apparatus 100 according to the first embodiment.

According to the image processing apparatus 100A according to the second embodiment, the convergence speed of the exposure control may be increased in addition to the advantage of the image processing apparatus 100 according to the first embodiment.

Further, in the case where the PGA gain is used for the exposure control of the short accumulation image, the short accumulation target exposure time and the threshold values SHT1, SHT2 are not directly compared.

That is, according to the image processing apparatus 100A according to the second embodiment, as is the case of the image processing apparatus 100 according to the first embodiment, it is preferable to compare the short accumulation target exposure time to values obtained by dividing the threshold values SHT1, SHT2 by the amount of PGA gain.

3. Third Embodiment

Next, the third embodiment of the invention will be explained.

Figure 13:
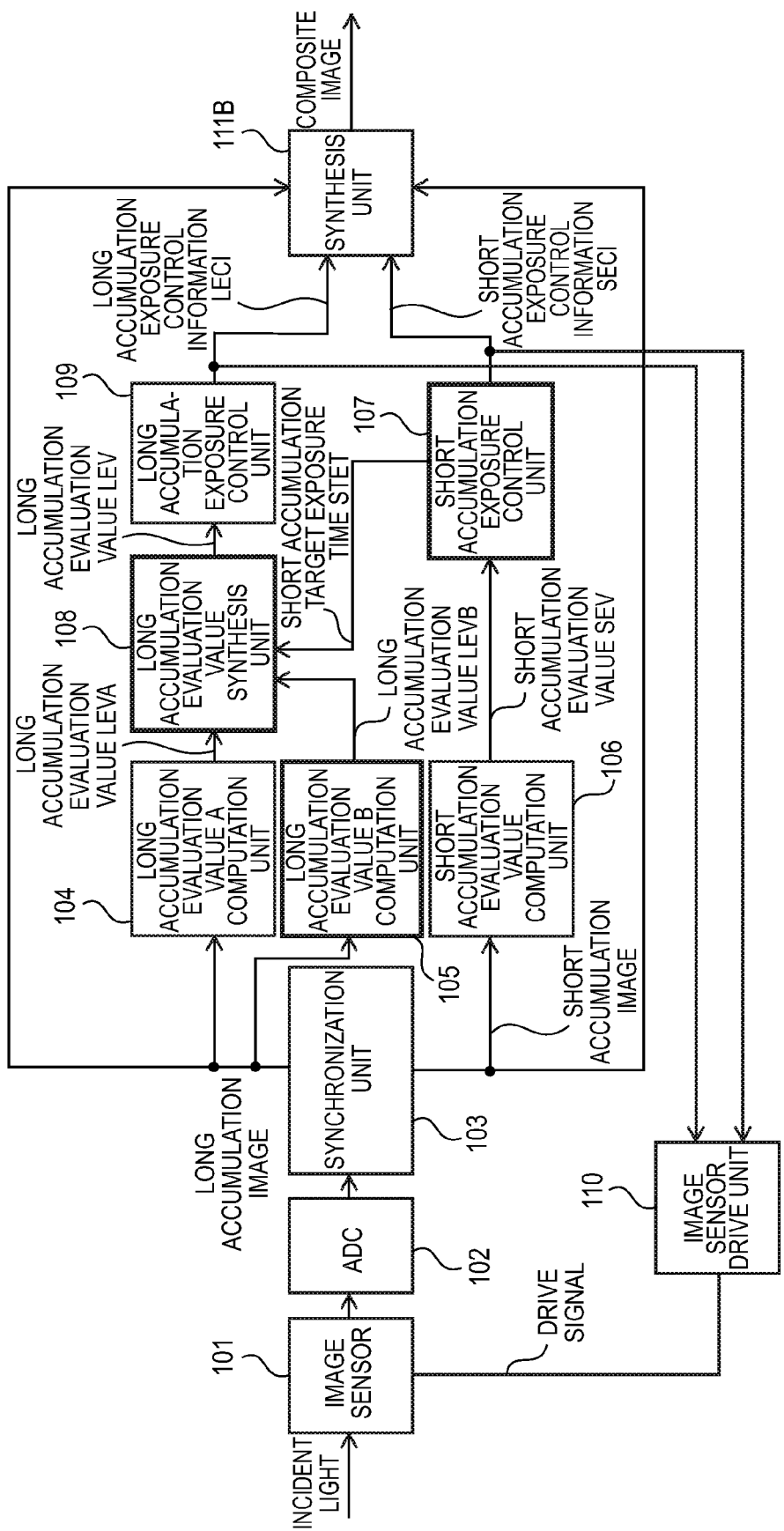
FIG. 13 is a block diagram showing a configuration example of an image processing apparatus according to a third embodiment of the invention.

FIG. 13 is a block diagram showing a configuration example of an image processing apparatus according to the third embodiment of the invention.

The image processing apparatus 100B according to the third embodiment is different from the image processing apparatuses 100, 100A according to the first and the second embodiments in the function of the synthesis unit 111B only. Accordingly, here, only the difference between the synthesis units will be explained.

The synthesis unit 111B inputs at least the long accumulation image, the short accumulation image, and the short accumulation target exposure time STET, and outputs either of a composite image obtained by synthesis of the two images or the long accumulation image.

Figure 14:
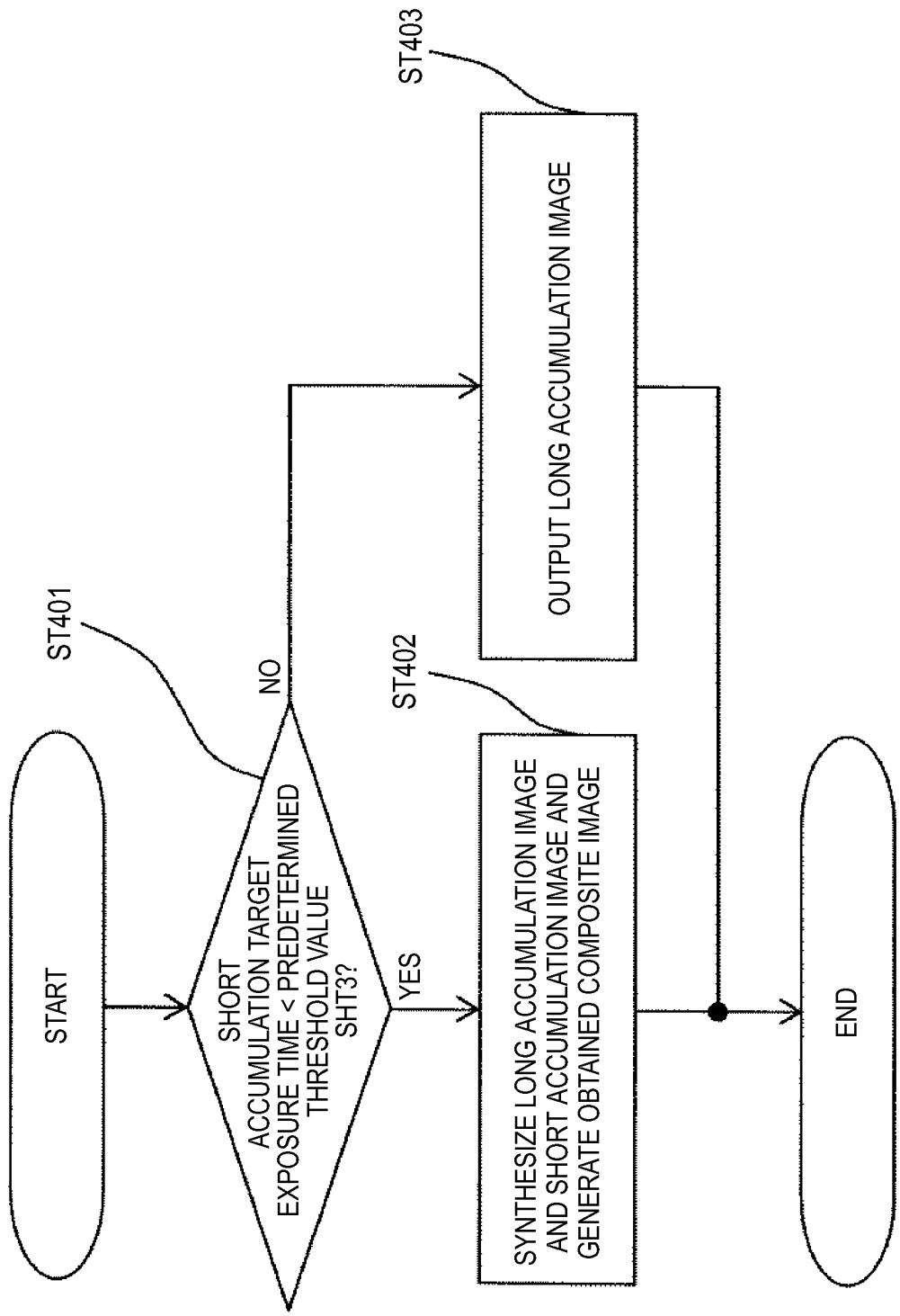
FIG. 14 is a flowchart showing an example of a flow of processing in a synthesis unit of the image processing apparatus according to the third embodiment of the invention.

FIG. 14 is a flowchart showing an example of a flow of processing in the synthesis unit 111B of the image processing apparatus 100B according to the third embodiment.

After the start of processing, the synthesis unit 111B checks the magnitude relation between the short accumulation target exposure time STET and a third threshold value SHT3 (step ST401). Here, it is assumed that the threshold value SHT3 satisfies the following relation.

(threshold value SHT3)(predetermined threshold value SHT) or (predetermined threshold value SHT2)  (4)

If (short accumulation target exposure time STET)< (threshold value SHT3) (step ST401/YES), processing equivalent to that of the synthesis unit 111 in the image processing apparatus 100, 100A according to the first or the second embodiment is performed.

That is, the long accumulation image and the short accumulation image are synthesized, the composite image obtained by the synthesis is output to the downstream (step ST402), and the processing is ended.

On the other hand, if (short accumulation target exposure time)≥(threshold value SHT3) (step ST401/NO), the synthesis is not performed and the long accumulation image is output without change (step ST403), and the processing is ended.

The image output by the synthesis unit 111 in the image processing apparatus 100, 100A according to the first or the second embodiment has been constantly formed by synthesizing the long accumulation image and the short accumulation image and output.

However, in the scene with low illuminance, if the exposure control of the long accumulation image has been completely switched to the exposure control of the short accumulation image, even when the synthesis is not performed and the long accumulation image itself is output, the problematic saturation at the high-brightness side does not occur.

This is an advantage not provided by the image processing apparatus described in Related Art 2 that does not change the exposure control method in response to the illuminance of the scene.

Figure 15:
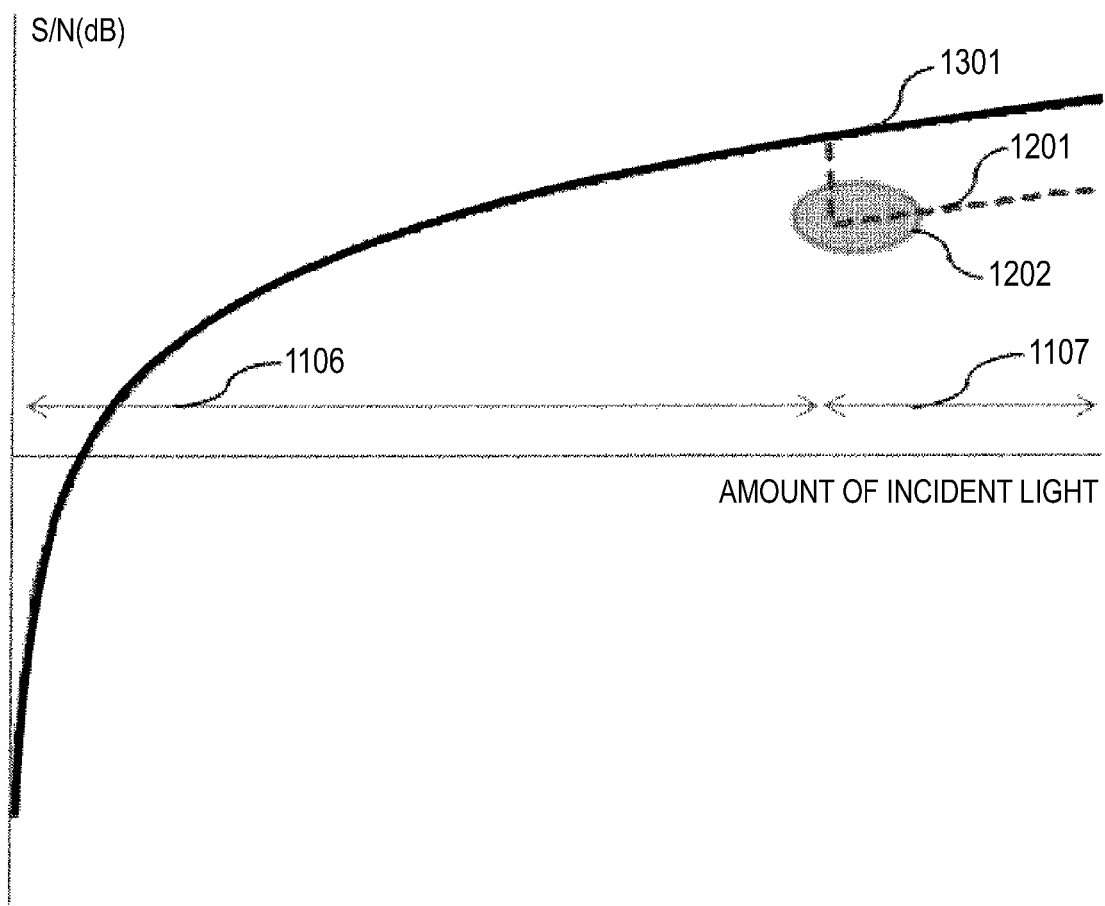
FIG. 15 shows plots for comparison of the S/N characteristics of composite images in combination between the image processing apparatus according to the first or the second embodiment of the invention and the image processing apparatus according to the third embodiment of the invention.

FIG. 15 shows plots for comparison of S/N characteristics of composite images in combination between the image processing apparatus 100, 100A according to the first or the second embodiment of the invention and the image processing apparatus 100B according to the third embodiment of the invention.

Here, 1301 shows a relationship between an amount of incident light and an S/N of a composite image in the image processing apparatus 100B according to the third embodiment.

From FIG. 15, the image processing apparatus 100B according to the third embodiment has the following additional advantages over the image processing apparatuses 100, 100A according to the first and the second embodiments.

That is, according to the image processing apparatus 100B according to the third embodiment, under the condition of low illuminance, the short accumulation image is not used but only the long accumulation image is used, and drop of the S/N in the high-brightness part does not occur.

Note that the technologies according to the first to third embodiments may be applied to the case where N (N is an integer number equal to or more than 3) images with different exposure times are synthesized.

For example, first, regarding two images with the shortest exposure times of the N images, the image with the longer exposure time is regarded as a long accumulation image and the image with the shorter exposure time is regarded as a short accumulation image, a composite image is obtained by application of the technologies.

Next, a step of applying the technologies to obtain a new composite image, while, of the rest of the images, one with the shortest exposure time is regarded as a long accumulation image and the composite image is regarded as a short accumulation image, may recursively be repeated until one composite image is finally obtained.

As explained above, according to the image processing apparatuses of the embodiments, the following advantages may be obtained.

In the low-illuminance scene, the S/N lowering of the high-brightness part in the composite image is reduced. Instead, a side effect of lowering of the S/N of the low-brightness part is produced, however, the side effect may be eliminated together with the S/N lowering remaining at the high-brightness side by applying a weak filter to the entire screen.

It is not necessary to apply a strong filter to only a part of the screen, unnaturalness that might appear at the boundary between the region in which the long accumulation image is selected and the region in which the short accumulation image is selected in the composite image is not produced.

In addition to the advantages, the convergence speed of the exposure control may be increased.

Occurrence of whiteout may be suppressed while S/N lowering in the high-brightness part is suppressed.

The S/N lowering in the high-brightness part may be completely eliminated.

4. Fourth Embodiment

The image processing apparatuses having the above described advantages may be applied as imaging devices for a digital camera or video camera.

Figure 16:
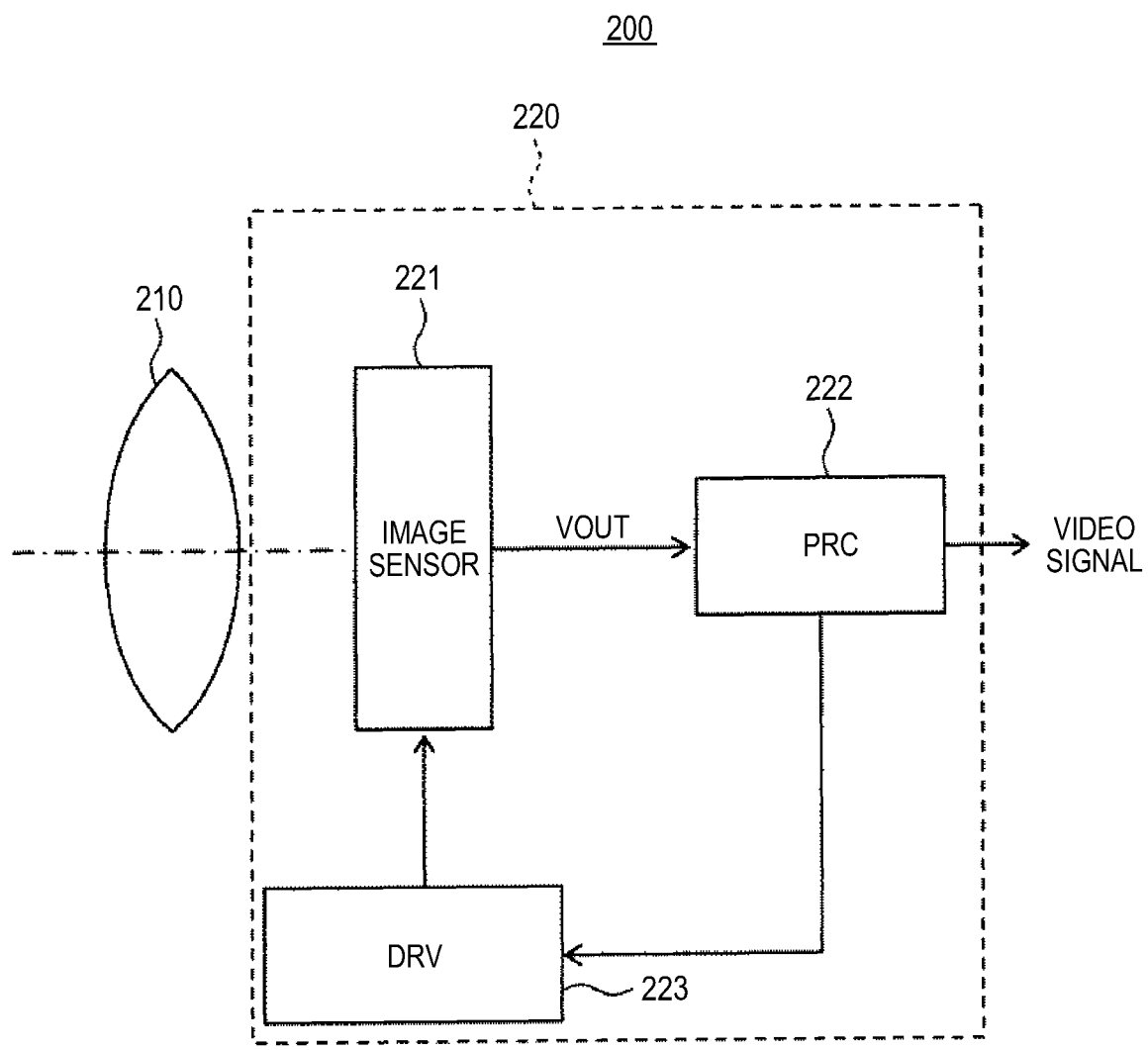
FIG. 16 shows an example of a configuration of a camera system to which the image processing apparatuses according to the embodiments of the invention are applied.

FIG. 16 shows an example of a configuration of a camera system to which the image processing apparatuses according to the embodiments of the invention are applied.

The camera system 200 has an optical system 210 and an image processing apparatus 220 as shown in FIG. 16.

To the image processing apparatus 220, the image processing apparatuses 100, 100A, 100B according to the embodiments may be applied.

The image processing apparatus 220 includes an image sensor 221 as an imaging device, a signal processing circuit (PRC) 222, and an image sensor drive unit (DRV) 223.

The image sensor 221 corresponds to the image sensors 101 in FIGS. 4, 10, 13 and the image sensor drive unit 223 corresponds to the image sensor drive units 110 in FIG. 4 etc.

The signal processing circuit 222 includes the ADC 102, the synchronization unit 103, the first long accumulation evaluation value computation unit 104, the second long accumulation evaluation value computation unit 105, the short accumulation evaluation value computation unit 106, the short accumulation exposure control unit 107, the long accumulation evaluation value synthesis unit 108, the long accumulation exposure control unit 109, and the synthesis unit 111 in FIG. 4 etc.

The optical system 210 has an optical system that guides incident light to a pixel region of the image sensor 221 as the imaging device (forms a subject image), for example, a lens 211 that forms incident light (image light) on an imaging surface.

The image sensor drive unit 223 has a timing generator (not shown) that generates various timing signals including start pulse and clock pulse for driving the circuit within the image sensor 221, and drives the image sensor 221 with a predetermined timing signal.

Further, the signal processing circuit 222 performs predetermined signal processing on the output signal of the image sensor 221 in the above described manner.

The image signal processed in the signal processing circuit 222 is recorded in a recording medium such as a memory. The image information recorded in the recording medium is hardcopied using a printer or the like. Further, the image signal processed in the signal processing circuit 222 is displayed as a moving image on a monitor of a liquid crystal display or the like.

As described above, in the imaging apparatus such as a digital still camera, by providing the above mentioned image processing apparatuses 100, 100A, 100B as the image processing apparatus 220, the same advantages as those described above may be obtained.

That is, in the low-illuminance scene, the S/N lowering of the high-brightness part in the composite image is reduced. Instead, a side effect of lowering of the S/N of the low-brightness part is produced, however, the side effect may be eliminated together with the S/N lowering remaining at the high-brightness side by applying a weak filter to the entire screen.

It is not necessary to apply a strong filter to only a part of the screen, unnaturalness that might appear at the boundary between the region in which the long accumulation image is selected and the region in which the short accumulation image is selected in the composite image is not produced.

In addition, the convergence speed of the exposure control may be increased.

Occurrence of whiteout may be suppressed while S/N lowering in the high-brightness part is suppressed.

The S/N lowering in the high-brightness part may be completely eliminated.

Note that the methods explained in detail as above may be formed as programs according to the procedures and configured to be executed by a computer such as a CPU or the like.

Further, the programs may be configured to be accessed and executed by a recording medium such as a semiconductor memory, a magnet disc, an optical disc, or a floppy (registered trademark) disc, and a computer in which the recording medium is set.

The present application contains subject matter related to that disclosed in Japanese Priority Patent Application JP 2010-124491 filed in the Japan Patent Office on May 31, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A camera system comprising:
   an image processing apparatus including an image sensor; and
   an optical system that forms a subject image in the image sensor,
   wherein the image processing apparatus includes
   an image sensor that is exposed to light, images, and outputs at least two images of a long accumulation image with a longer exposure time and a short accumulation image with a shorter exposure time in one field,
   a first long accumulation evaluation value computation unit that computes an exposure evaluation value from the long accumulation image and outputs the value as a first long accumulation evaluation value,
   a second long accumulation evaluation value computation unit that computes an exposure evaluation value from the long accumulation image according to a different method from that of the first long accumulation evaluation value computation unit, and outputs the value as a second long accumulation evaluation value,
   a short accumulation evaluation value computation unit that computes an exposure evaluation value from the short accumulation image and outputs the value as a short accumulation evaluation value,
   a short accumulation exposure control unit that acquires a short accumulation target exposure time and short accumulation exposure control information from the short accumulation evaluation value and a first target level,
   a long accumulation evaluation value synthesis unit that acquires a long accumulation evaluation value by synthesizing the first long accumulation evaluation value and the second long accumulation evaluation value in response to the short accumulation target exposure time using a predetermined method,
   a long accumulation exposure control unit that acquires long accumulation exposure control information from the long accumulation evaluation value and a second target level, and
   an image sensor drive unit that drives the image sensor from the long accumulation exposure control information and the short accumulation exposure control information;
   a synthesis unit that generates an image from the long accumulation image and the short accumulation image in response to the long accumulation exposure control information and the short accumulation exposure control information.

2. The camera system according to claim 1, further comprising an image sensor drive unit that drives the image sensor from the long accumulation exposure control information and the short accumulation exposure control information.

3. The camera system according to claim 1, wherein the long accumulation exposure control information and the short accumulation exposure control information contain information of exposure times.

4. The camera system according to claim 1, wherein the first target level and the second target level take the same value.

5. The camera system according to claim 1, wherein the first long accumulation evaluation value computation unit computes the exposure evaluation value by putting a weight toward a low-brightness side, the second long accumulation evaluation value computation unit computes the exposure evaluation value by putting a weight toward a high-brightness side, and the short accumulation evaluation value computation unit computes the exposure evaluation value by putting a weight toward the high-brightness side, respectively.

6. The camera system according to claim 5, wherein the weights are equal in the second long accumulation evaluation value computation unit and the short accumulation evaluation value computation unit.

7. The camera system according to claim 1, wherein the long accumulation evaluation value synthesis unit takes the first long accumulation evaluation value if the short accumulation target exposure time is less than a first threshold value, and takes the second long accumulation evaluation value if the short accumulation target exposure time is equal to or more than the first threshold value as the long accumulation evaluation value, respectively.

8. The camera system according to claim 7, wherein the first threshold value is a value exceeding the shortest exposure time of the long accumulation image and the longest exposure time of the short accumulation image.

9. The camera system according to claim 7, wherein, if an amount of PGA gain in the short accumulation image is larger, the first threshold value is smaller.

10. The camera system according to claim 1, wherein the long accumulation evaluation value synthesis unit takes the first long accumulation evaluation value if the short accumulation target exposure time is less than a second threshold value, takes the second long accumulation evaluation value if the short accumulation target exposure time is equal to or more than a third threshold value larger than the second threshold value, and takes a value obtained by complementing the first long accumulation evaluation value and the second long accumulation evaluation value using a predetermined method if the short accumulation target exposure time is equal to or more than the second threshold value and less than the third threshold value as the long accumulation evaluation value, respectively.

11. The camera system according to claim 10, wherein the second threshold value takes a value exceeding the shortest exposure time of the long accumulation image and the longest exposure time of the short accumulation image.

12. The camera system according to claim 10, wherein, if an amount of PGA gain in the short accumulation image is larger, the second and third threshold values are smaller.

13. The camera system according to claim 1, wherein, if the short accumulation target exposure time is equal to or more than a fourth threshold value, in the synthesis unit, not the composite image of the long accumulation image and the short accumulation image, but the long accumulation image itself is output.

14. The camera system according to claim 13, wherein the fourth threshold value is equal to or more than the first threshold value.

15. The camera system according to claim 13, wherein the fourth threshold value is equal to or more than the third threshold value.

16. An image processing method, the method comprising:
imaging, within one field, at least a long accumulation image with a longer exposure time and a short accumulation image with a shorter exposure time;
computing an exposure evaluation value from the long accumulation image to obtain a first long accumulation evaluation value;
computing an exposure evaluation value from the long accumulation image according to a different method from that used to obtain the first long accumulation evaluation value to obtain a second long accumulation evaluation value;
computing an exposure evaluation value from the short accumulation image to obtain a short accumulation evaluation value;
obtaining a short accumulation target exposure time and short accumulation exposure control information from the short accumulation evaluation value and a first target level;
obtaining a long accumulation evaluation value by synthesizing the first long accumulation evaluation value and the second long accumulation evaluation value in response to the short accumulation target exposure time using a predetermined method;
acquiring long accumulation exposure control information from the long accumulation evaluation value and a second target level; and
generating an image from the long accumulation image and the short accumulation image in response to the long accumulation exposure control information and the short accumulation exposure control information.

17. The method according to claim 16, further comprising driving an image sensor from the long accumulation exposure control information and the short accumulation exposure control information.

18. The method according to claim 16, wherein the long accumulation exposure control information and the short accumulation exposure control information contain information of exposure times.

19. The method according to claim 16, wherein the first target level and the second target level take the same value.

20. The method according to claim 16, wherein computing the exposure evaluation value to obtain the first long accumulation evaluation value comprises computing the exposure evaluation value by putting a weight toward a low-brightness side, and computing the exposure evaluation value to obtain the second long accumulation evaluation value comprises computing the exposure evaluation value by putting a weight toward a high-brightness side, and computing the exposure evaluation value to obtain the short accumulation evaluation value comprises computing the exposure evaluation value by putting a weight toward the high-brightness side, respectively.

21. The method according to claim 20, wherein the weights are equal in computing the second long accumulation evaluation value and the short accumulation evaluation value.

22. The method according to claim 16, wherein the long accumulation evaluation value is obtained by taking the first long accumulation evaluation value if the short accumulation target exposure time is less than a first threshold value, and taking the second long accumulation evaluation value if the short accumulation target exposure time is equal to or more than the first threshold value as the long accumulation evaluation value, respectively.

23. The method according to claim 22, wherein the first threshold value is a value exceeding the shortest exposure time of the long accumulation image and the longest exposure time of the short accumulation image.

24. The method according to claim 22, wherein, if an amount of PGA gain in the short accumulation image is larger, the first threshold value is smaller.

25. The method according to claim 16, wherein the long accumulation evaluation value is obtained by taking the first long accumulation evaluation value if the short accumulation target exposure time is less than a second threshold value, taking the second long accumulation evaluation value if the short accumulation target exposure time is equal to or more than a third threshold value larger than the second threshold value, and taking a value obtained by complementing the first long accumulation evaluation value and the second long accumulation evaluation value using a predetermined method if the short accumulation target exposure time is equal to or more than the second threshold value and less than the third threshold value as the long accumulation evaluation value, respectively.

26. The method according to claim 25, wherein the second threshold value takes a value exceeding the shortest exposure time of the long accumulation image and the longest exposure time of the short accumulation image.

27. The method according to claim 25, wherein, if an amount of PGA gain in the short accumulation image is larger, the second and third threshold values are smaller.

28. The method according to claim 16, wherein, if the short accumulation target exposure time is equal to or more than a fourth threshold value, in generating the image, not the composite image of the long accumulation image and the short accumulation image, but the long accumulation image itself is output to downstream processing.

29. The method according to claim 28, wherein the fourth threshold value is equal to or more than the first threshold value.

30. The method according to claim 28, wherein the fourth threshold value is equal to or more than the third threshold value.

31. A non-transitory computer readable medium storing program code executable by a processing unit to perform operations comprising:
    imaging, within one field, at least a long accumulation image with a longer exposure time and a short accumulation image with a shorter exposure time;
    computing an exposure evaluation value from the long accumulation image to obtain a first long accumulation evaluation value;
    computing an exposure evaluation value from the long accumulation image according to a different method from that used to obtain the first long accumulation evaluation value to obtain a second long accumulation evaluation value;
    computing an exposure evaluation value from the short accumulation image to obtain a short accumulation evaluation value;
    obtaining a short accumulation target exposure time and short accumulation exposure control information from the short accumulation evaluation value and a first target level;
    obtaining a long accumulation evaluation value by synthesizing the first long accumulation evaluation value and the second long accumulation evaluation value in response to the short accumulation target exposure time using a predetermined method;
    acquiring long accumulation exposure control information from the long accumulation evaluation value and a second target level; and
    generating an image from the long accumulation image and the short accumulation image in response to the long accumulation exposure control information and the short accumulation exposure control information.

32. The non-transitory computer readable medium according to claim 31, further comprising driving an image sensor from the long accumulation exposure control information and the short accumulation exposure control information.

33. The non-transitory computer readable medium according to claim 31, wherein the long accumulation exposure control information and the short accumulation exposure control information contain information of exposure times.

34. The non-transitory computer readable medium according to claim 31, wherein the first target level and the second target level take the same value.

35. The non-transitory computer readable medium according to claim 31, wherein computing the exposure evaluation value to obtain the first long accumulation evaluation value comprises computing the exposure evaluation value by putting a weight toward a low-brightness side, and computing the exposure evaluation value to obtain the second long accumulation evaluation value comprises computing the exposure evaluation value by putting a weight toward a high-brightness side, and computing the exposure evaluation value to obtain the short accumulation evaluation value comprises computing the exposure evaluation value by putting a weight toward the high-brightness side, respectively.

36. The non-transitory computer readable medium according to claim 35, wherein the weights are equal in computing the second long accumulation evaluation value and the short accumulation evaluation value.

37. The non-transitory computer readable medium according to claim 31, wherein the long accumulation evaluation value is obtained by taking the first long accumulation evaluation value if the short accumulation target exposure time is less than a first threshold value, and taking the second long accumulation evaluation value if the short accumulation target exposure time is equal to or more than the first threshold value as the long accumulation evaluation value, respectively.

38. The non-transitory computer readable medium according to claim 37, wherein the first threshold value is a value exceeding the shortest exposure time of the long accumulation image and the longest exposure time of the short accumulation image.

39. The non-transitory computer readable medium according to claim 37, wherein, if an amount of PGA gain in the short accumulation image is larger, the first threshold value is smaller.

40. The non-transitory computer readable medium according to claim 31, wherein the long accumulation evaluation value is obtained by taking the first long accumulation evaluation value if the short accumulation target exposure time is less than a second threshold value, taking the second long accumulation evaluation value if the short accumulation target exposure time is equal to or more than a third threshold value larger than the second threshold value, and taking a value obtained by complementing the first long accumulation evaluation value and the second long accumulation evaluation value using a predetermined method if the short accumulation target exposure time is equal to or more than the second threshold value and less than the third threshold value as the long accumulation evaluation value, respectively.

41. The non-transitory computer readable medium according to claim 40, wherein the second threshold value takes a value exceeding the shortest exposure time of the long accumulation image and the longest exposure time of the short accumulation image.

42. The non-transitory computer readable medium according to claim 40, wherein, if an amount of PGA gain in the short accumulation image is larger, the second and third threshold values are smaller.

43. The non-transitory computer readable medium according to claim 31, wherein, if the short accumulation target exposure time is equal to or more than a fourth threshold value, in generating the image, not the composite image of the long accumulation image and the short accumulation image, but the long accumulation image itself is output to downstream processing.

44. The non-transitory computer readable medium according to claim 43, wherein the fourth threshold value is equal to or more than the first threshold value.

45. The non-transitory computer readable medium according to claim 43, wherein the fourth threshold value is equal to or more than the third threshold value.

\* \* \* \* \*